United States Patent
Torii et al.

(10) Patent No.: US 7,249,884 B2
(45) Date of Patent: Jul. 31, 2007

(54) RADIATION THERMOMETER

(75) Inventors: Tomonari Torii, Osaka (JP); Choryon Oh, Osaka (JP)

(73) Assignee: Keyence Corporation, Osaka (JP)

( * ) Notice: Subject to any disclaimer, the term of this patent is extended or adjusted under 35 U.S.C. 154(b) by 26 days.

(21) Appl. No.: 11/324,060

(22) Filed: Dec. 30, 2005

(65) Prior Publication Data

US 2006/0153273 A1 Jul. 13, 2006

(30) Foreign Application Priority Data

Jan. 7, 2005 (JP) .................... P 2005-002554
May 19, 2005 (JP) .................... P 2005-147242

(51) Int. Cl.
| | |
|---|---|
| G01J 5/02 | (2006.01) |
| G01J 5/12 | (2006.01) |
| G01K 7/02 | (2006.01) |
| G01K 1/00 | (2006.01) |
| A61B 6/00 | (2006.01) |

(52) U.S. Cl. .................. 374/121; 374/163; 374/208; 600/474

(58) Field of Classification Search ........... 374/120, 374/121, 130, 163, 183, 208; 600/549, 474; 702/139

See application file for complete search history.

(56) References Cited

U.S. PATENT DOCUMENTS

| 4,722,612 A | * | 2/1988 | Junkert et al. ............... 374/124 |
| 5,159,936 A | * | 11/1992 | Yelderman et al. .......... 600/549 |
| 5,169,234 A | * | 12/1992 | Bohm ......................... 374/128 |
| 5,325,863 A | * | 7/1994 | Pompei ....................... 600/549 |
| RE34,789 E | * | 11/1994 | Fraden ........................ 702/104 |
| 5,368,038 A | * | 11/1994 | Fraden ........................ 600/474 |
| 5,626,139 A | * | 5/1997 | Szeles et al. ................ 600/549 |
| 5,645,349 A | * | 7/1997 | Fraden ........................ 374/120 |
| 7,040,806 B2 | * | 5/2006 | Ishikawa et al. ............. 374/120 |
| 2004/0233968 A1 | * | 11/2004 | Tabata et al. ................ 374/121 |

FOREIGN PATENT DOCUMENTS

| JP | 04299225 A | * 10/1992 |
| JP | A-7-324981 | 12/1995 |

* cited by examiner

*Primary Examiner*—Gail Verbitsky
(74) *Attorney, Agent, or Firm*—Kilyk & Bowersox, P.L.L.C.

(57) ABSTRACT

In the head portion, the thermopile is arranged substantially in the center of the head portion. The preamplifier board is arranged near the thermopile. The heat diffusion member made of a high heat conductive material is arranged so as to surround the thermopile and the preamplifier board. The main board and the laser diode are arranged between the upper surface of the head casing and the upper surface of the heat diffusion member. The power supply board and the laser diode are arranged between the down surface of the head casing and the down surface of the heat diffusion member. The thermopile, the preamplifier board, the main board, the power supply board, and the laser diodes are arranged out of contact with the heat diffusion member.

14 Claims, 24 Drawing Sheets

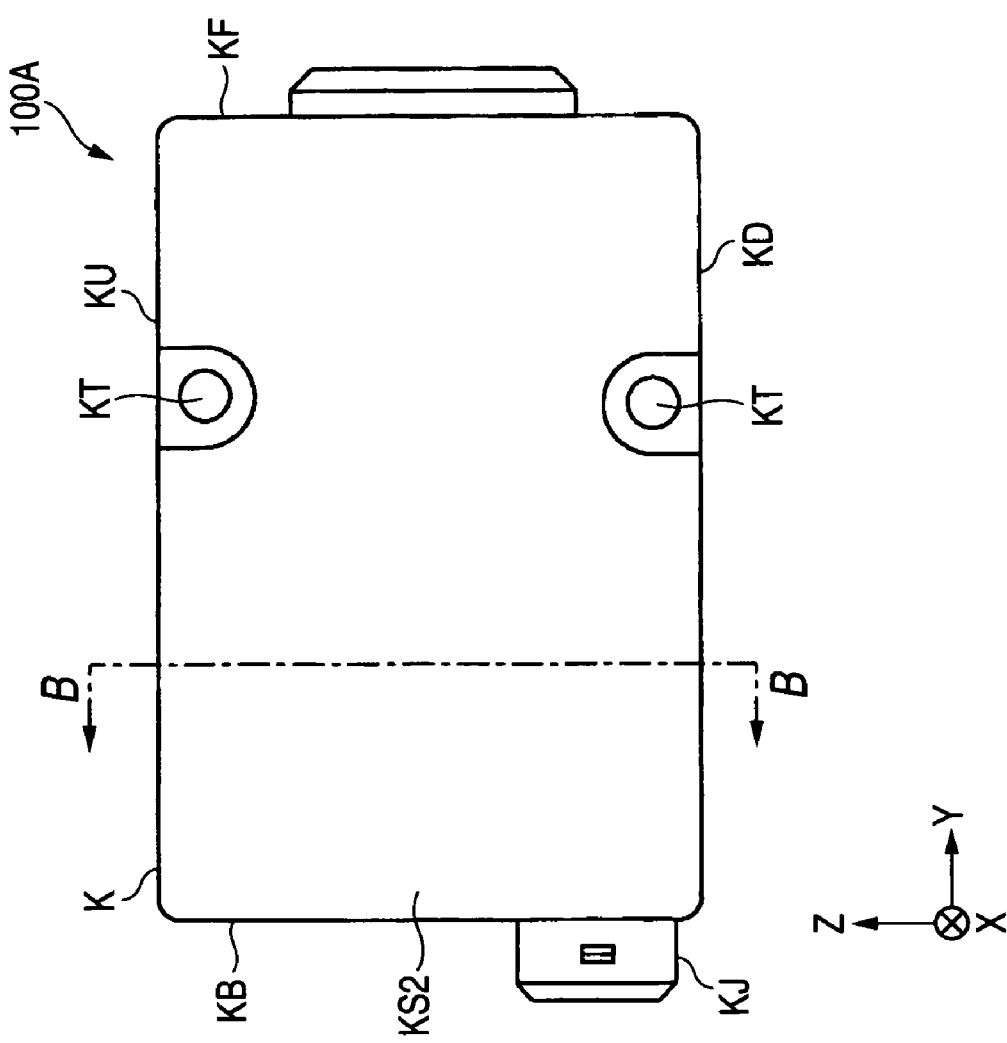
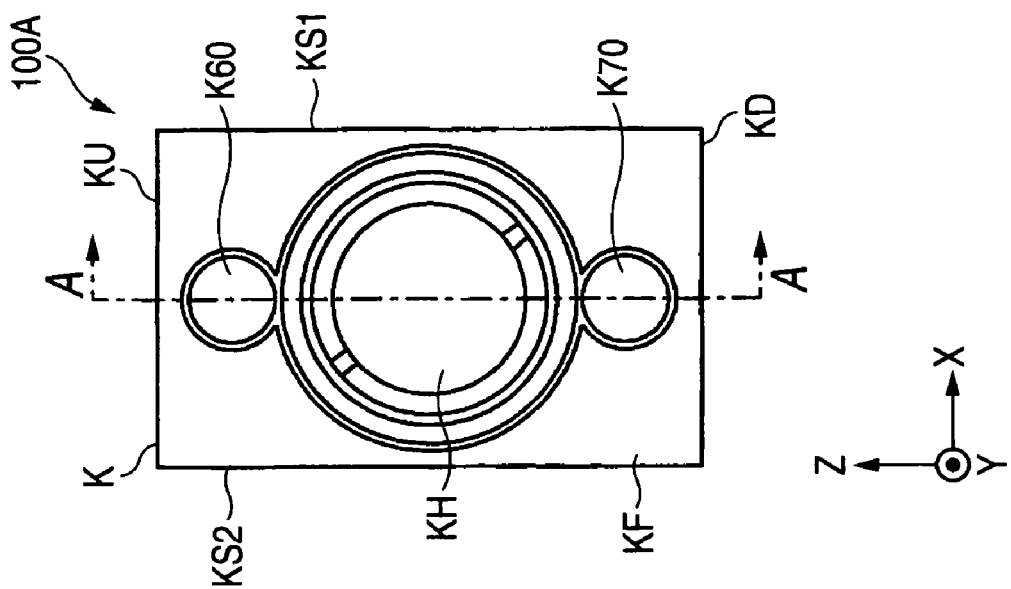

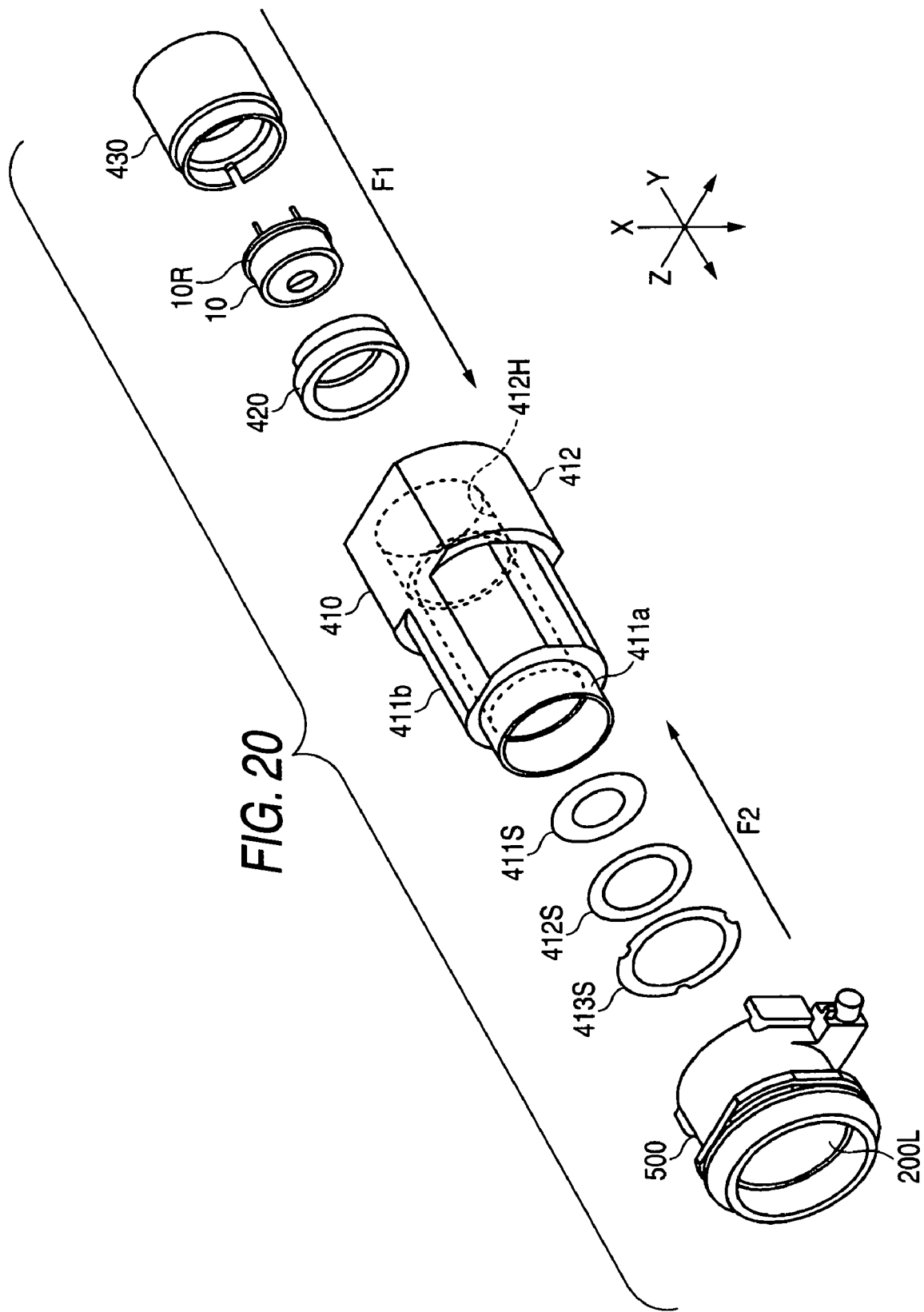

RADIATION THERMOMETER

BACKGROUND OF THE INVENTION

1. Field of the Invention

The invention relates to a radiation thermometer, which measures temperature of an object by detecting infrared energy radiated from the object.

2. Description of the Related Art

There has been, heretofore, a radiation thermometer (for example, refer to Japanese Patent Laid-Open No. 7-324981) which detects infrared energy radiated from an object to be measured and calibrates the infrared energy by emissivity of the object, hence to measure the actual temperature of the object to be measured.

Generally, a radiation thermometer detects infrared energy by heat sensitive element such as a thermopile. The thermopile includes an infrared radiation receiving portion (hot junction) having a plurality of thermocouples connected in a series. In this thermopile, when infrared radiation enters the infrared radiation receiving portion, there occurs a temperature difference between the hot junction and the cold junction depending on the amount of the incident infrared radiation, and thermo electromotive force is produced according to the difference. This thermo electromotive force corresponds to the temperature of the object to be measured.

The temperature of the cold junction of the thermopile changes according to the inner temperature of the thermopile. The temperature of the object measured by the thermopile is calibrated according to the inner temperature of the thermopile, while measuring the inner temperature of the thermopile with a thermistor. This can get an accurate temperature of the object to be measured.

In this radiation thermometer, since the infrared energy radiated from the object to be measured is invisible, a user cannot recognize which position of the object to be measured is being measured.

A radiation thermometer has been developed which can indicate a measuring position with light source such as laser diode (LD) or light emitting diode (LED) in order for a user to recognize the measuring position.

The radiation thermometer capable of indicating a measuring position, however, is apt to enlarge in size because it contains a light source such as a laser diode or a light emitting diode.

When the heat generated by the light source in order to indicate a measuring position is locally transmitted to the thermopile, the inner temperature of the thermopile becomes uneven. In this case, the thermistor cannot detect an accurate inner temperature of the thermopile.

Additionally, there is the case where the infrared radiation radiated from the peripheral members of the thermopile (for example, holding member of the thermopile and the like) enters the infrared radiation receiving portion. When the temperature of the peripheral members agrees with the inner temperature of the thermopile, the amount of the infrared radiation of the peripheral members entering the infrared radiation receiving portion can be calculated according to the inner temperature of the thermopile. By subtracting the infrared radiation amount of the peripheral members from all the infrared radiation amount entering the infrared radiation receiving portion, it is possible to accurately obtain the infrared radiation amount only for the object to be measured.

When the temperature of the peripheral members becomes uneven according to the heat of the light source, or when the temperature of the peripheral members is different from the inner temperature of the thermopile, the infrared radiation amount of the peripheral members entering the infrared radiation receiving portion cannot be calculated according to the inner temperature of the thermopile. It is impossible to accurately obtain the infrared radiation amount only for the object to be measured from all the infrared radiation entering the infrared radiation receiving portion.

In order to measure an accurate temperature of the object to be measured, it is necessary to set a distance between the thermopile and the light source as large as possible so as not to locally transmit heat to the thermopile and so as to make the atmospheric temperature near the thermopile equal to the inner temperature of the thermopile. As a result, downsizing of the radiation thermometer is increasingly difficult.

Since an output signal of the thermopile is very small, an output signal of the thermopile has to be amplified with a high amplification factor. When the output signal of the thermopile is affected by the noise, measurement accuracy is remarkably reduced.

SUMMARY OF THE INVENTION

The present invention is to provide a radiation thermomter which can indicate a measuring position and assure high measurement accuracy while downsizing.

The radiation thermometer according to the invention is a radiation thermometer for measuring temperature of an object to be measured, comprising: a casing having a first and a second surfaces mutually facing and a third and a fourth surfaces mutually facing and including an infrared radiation passing unit which passes the infrared radiation radiated from the object to be measured, on the first surface; a sensing element located within the casing, which detects the infrared energy of passing through the infrared radiation passing unit; a first board located within the casing between the second surface and the sensing element along the second surface, on which board a first circuit for amplifying an output signal of the sensing element is installed; a second board located within the casing between the third surface and the sensing element along the third surface, on which board a second circuit for calculating a temperature of the object to be measured according to a signal given from the first circuit of the first board is installed; a third board located within the casing between the fourth surface and the sensing element along the fourth surface, on which board a third circuit for supplying power to the first and the second circuits is installed; a first and a second light sources located within the casing, which emit light to the object to be measure and a heat diffusion member located within the casing, in which an infrared radiation passage for leading the infrared radiation from the infrared radiation passing unit to the sensing element is formed within the casing, the first and the second light sources are respectively located between the infrared radiation passage and the third surface and between the infrared radiation passage and the fourth surface, and the heat diffusion member is located between the infrared radiation passage and the first light source, between the infrared radiation passage and the second light source, between the second board and each of the sensing element and the first board, and between the third board and each of the sensing element and the first board.

According to the radiation thermometer of the invention, the first and the second light sources emit light to an object to be measured. The infrared radiation radiated from the object to be measured enters the sensing element through the infrared radiation passing unit on the first surface of the casing and the infrared radiation passage within the casing.

The incident energy of the infrared radiation is detected by the sensing element. The output signal of the sensing element is amplified by the first circuit on the first board. The second circuit on the second board calculates the temperature of the object to be measured according to the signal given from the first circuit.

According to the radiation thermometer of the invention, a measurement position of the object to be measured is indicated by the light radiated from the first and second light sources to the object to be measured. In particular, two of the first and the second light sources are used, and by properly setting the indication form of a measurement position by the mutual light emitted from the both light sources, the measurement position can be indicated with high accuracy and the temperature can be measured with higher accuracy.

In the casing, since the first board is located between the second surface of the casing and the sensing element along the second surface, the distance between the sensing element and the first board can be shortened. In this case, since the wiring between the sensing element and the first board can be shortened, the output signal of the sensing element is hardly affected by noise. As a result, the radiation thermometer can calculate the temperature of the object to be measured with high accuracy.

Within the casing, since the heat diffusion member is located between the second board and each of the sensing element and the first board, even when there occurs heat in the second board, the heat is diffused by the heat diffusion member.

The third circuit installed on the third board is used for power supply and it easily generates heat. Since the heat diffusion member is located between the third board and each of the sensing element and the first board, even when heat is generated in the third board, the heat is diffused by the heat diffusion member.

The first and second light sources emit light, hence to generate heat. Since the heat diffusion member is located between each of the first and the second light sources and the infrared radiation passage, the heat of the first and the second light sources is diffused by the heat diffusion member.

Since the heat generated by the second and the third boards and the first and the second light sources is diffused by the heat diffusion member, the atmospheric temperature within the casing is kept substantially even. As a result, the local heat transmission to the sensing element is prevented and temperature can be measured with high accuracy.

In particular, since the first and the second light sources are located near the infrared radiation passage within the casing and not adjacent to the sensing element, the local heat transmission to the sensing element can be further prevented.

Thus, since the local heat transmission to the sensing element can be prevented owing to the arrangement of the heat diffusion member, it is possible to arrange the first and the second light sources, the first, the second, and the third boards, and the sensing element adjacently to each other within the casing. Then, the radiation thermometer can be downsized adequately.

Since the first and the second light sources are arranged in an empty space around the infrared radiation passage within the casing, it is possible to prevent from enlargement of the radiation thermometer resulting from providing the first and the second light sources.

The casing further has a fifth and a sixth surfaces. The heat diffusion member may be located between the fifth surface and each of the sensing element, the first board, and the infrared radiation passage. The heat diffusion member may be located between the sixth surface and each of the sensing element, the first board, and the infrared radiation passage.

In this case, since the heat diffusion member is located between the fifth surface and each of the sensing element, the first board and the infrared radiation passage and between the sixth surface and each of the sensing element, the first board, and the infrared radiation passage, the heat generated by the second and the third boards and the first and the second light sources is diffused over a wide range. Then, the temperature within the casing can be kept even. As a result, the local heat transmission to the sensing element can be further prevented and the highly accurate temperature measurement can be realized.

Space maybe provided between the heat diffusion member and each of the sensing element and the first board and between the heat diffusion member and each of the second board, the third board, the first light source, and the second light source.

In this case, air layer exists in the space between the heat diffusion member and each of the sensing element and the first board and in the space between the heat diffusion member and each of the second board, the third board, the first light source, and the second light source. This air layer works as a heat insulating layer and the heat generated in the second board, the third board, the first light source, and the second light source is hardly transmitted to the sensing element. In this state, the heat generated in the second board, the third board, the first light source, and the second light source is diffused by the heat diffusion member. Then, the temperature within the casing can be kept even and an increase in the temperature can be restrained within the casing.

The second circuit may include a first driving circuit for driving the first light source and a control circuit for calculating the temperature of the object to be measured according to the signal given from the first circuit and controlling the first driving circuit.

In this case, in the second board with the second circuit installed there, the first driving circuit for driving the first light source easily generates heat. Since the heat diffusion member is located between the second board and each of the sensing element and the first board, even when heat is generated in the second board, the heat is diffused by the heat diffusion member.

The second circuit may include the indication element and the control circuit may control the indication element according to the calculated temperature of the object to be measured.

In this case, in the second board with the second circuit installed there, the indication element easily generates heat. Since the heat diffusion member is located between the second board and each of the sensing element and the first board, even when heat is generated in the second board, the heat is diffused by the heat diffusion member.

The third circuit may include a second driving circuit for driving the second light source and the control circuit may control the second driving circuit. In this case, in the third board with the third circuit installed there, the second driving circuit for driving the second light source easily generates heat. Since the heat diffusion member is located between the third board and each of the sensing element and the first board, even when heat is generated in the third board, the heat is diffused by the heat diffusion member.

BRIEF DESCRIPTION OF THE DRAWINGS

FIGS. 7A and 7B are views for use in describing the detailed structure of the head portion of the radiation thermometer according to the first embodiment.

FIG. 20 is a view showing the state of assembling the infrared radiation concentrating unit used for the head portion of the radiation thermometer according to the second embodiment.

DETAILED DESCRIPTION OF THE INVENTION

Hereinafter, a radiation thermometer according to embodiments of the invention will be described according to FIG. 1 to FIG. 24.

FIRST EMBODIMENT (1) Functional Structure of the Radiation Thermometer

Figure 1:
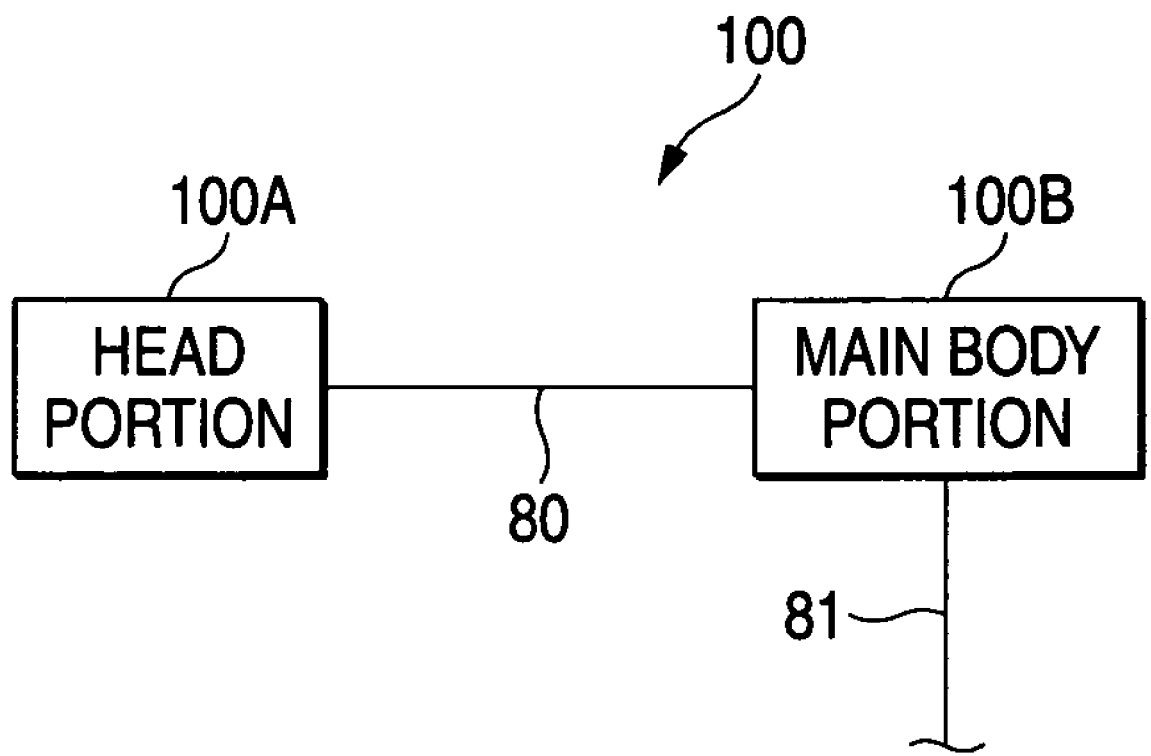
FIG. 1 is a block diagram of a radiation thermometer according to the first embodiment.

FIG. 1 is a block diagram of a radiation thermometer according to the first embodiment. As illustrated in FIG. 1, a radiation thermometer 100 according to the first embodiment includes a head portion 100A and a main body portion. The head portion 100A and the main body portion 100B are connected to each other via a cable 80. The main body portion 100B is connected to an external device not illustrated via a cable 81.

Figure 2:
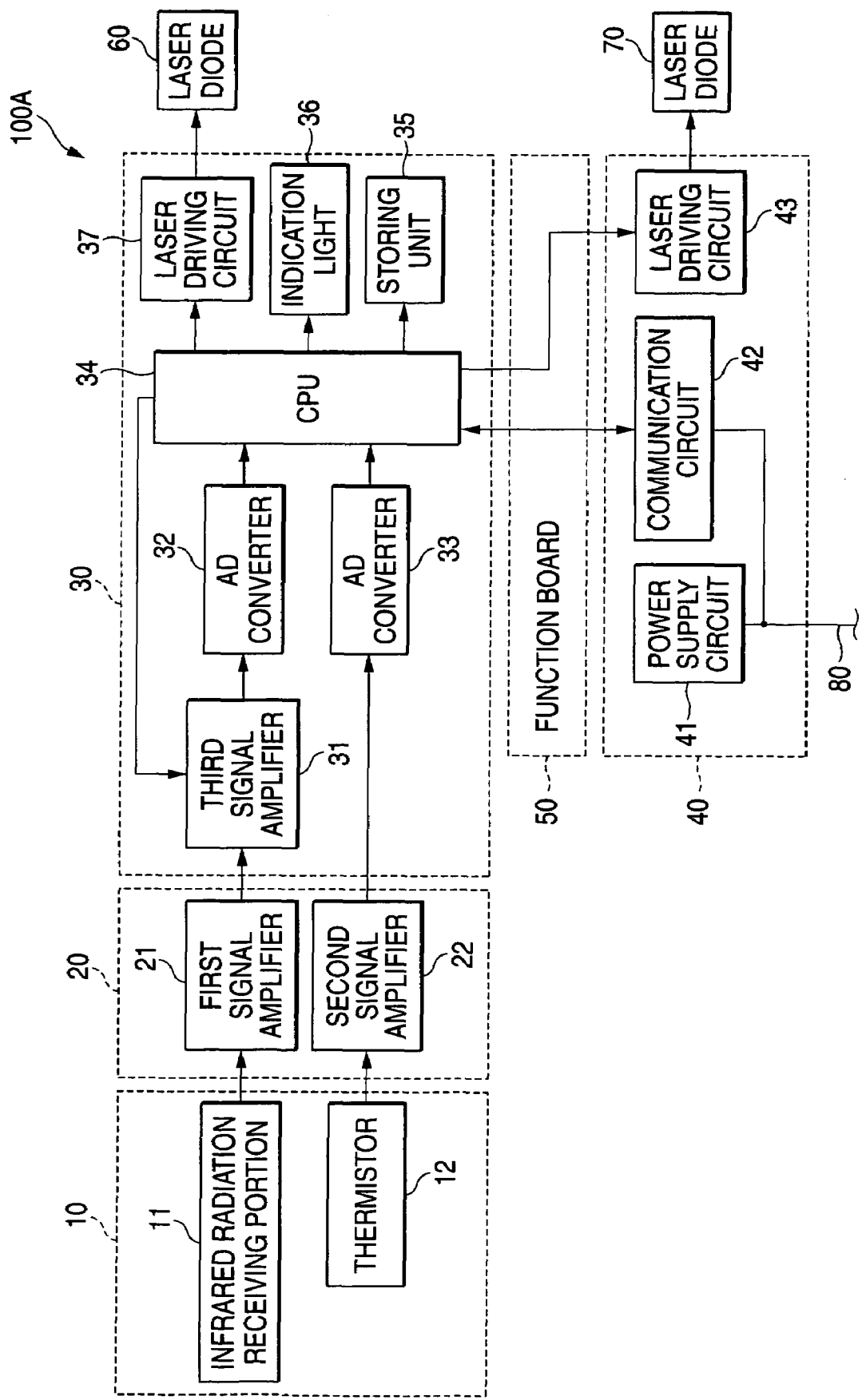
FIG. 2 is a block diagram of the head portion of FIG. 1.
Figure 3:
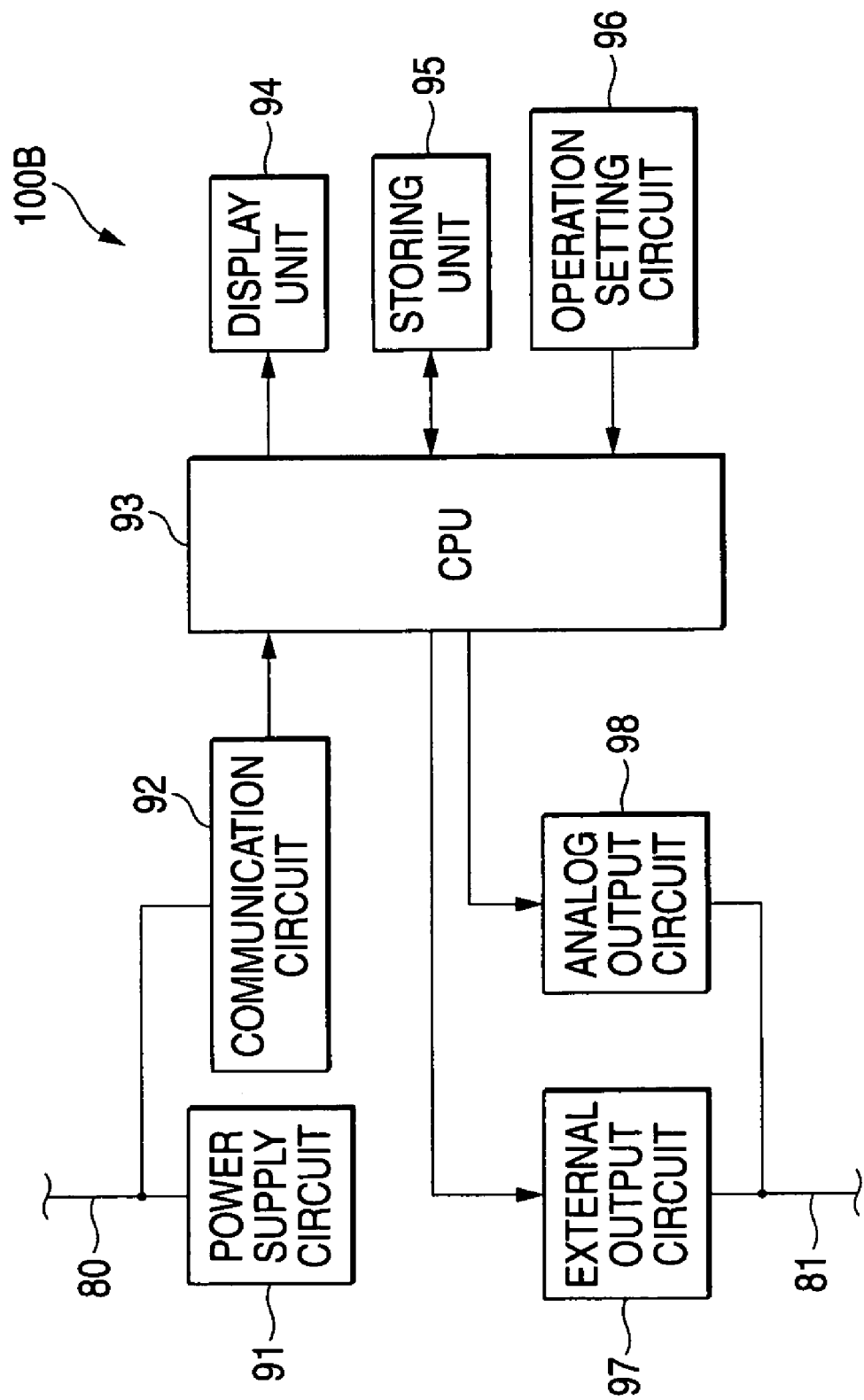
FIG. 3 is a block diagram of the main body portion of FIG. 1.

FIG. 2 is a block diagram of the head portion 100A of FIG. 1 and FIG. 3 is a block diagram of the main body portion 100B of FIG. 1.

As illustrated in FIG. 2, the head portion 100A includes a thermopile 10, a preamplifier board 20, a main board 30, a power supply board 40, a junction board 50, and two laser diodes 60 and 70.

The thermopile 10 includes an infrared radiation receiving portion 11 (infrared radiation detecting chip) and a thermistor 12. The preamplifier board 20 includes a first signal amplifier 21 and a second signal amplifier 22. The main board 30 includes a third signal amplifier 31, analog-digital converters (hereinafter, abbreviated as AD converter) 32 and 33, a CPU (Central Processing Unit) 34, a storing unit 35, an indication light 36, and a laser driving circuit 37.

The power supply board 40 includes a power supply circuit 41, a communication circuit 42, and a laser driving circuit 43. The power supply board 40 is connected to a cable 80 including a power supply line and a signal line.

The junction board 50 is provided with a wired surface having a plurality of wirings, which electrically connects the main board 30 to the power supply board 40. The junction board 50 is provided with a ground conductive surface described later, which is connected to the earth terminals of the respective components of the head portion 10A.

In the thermopile 10, the infrared radiation receiving portion 11 detects infrared energy radiated from an object to be measured. The thermistor 12 detects an inner temperature of the thermopile 10.

In the preamplifier board 20, the first signal amplifier 21 amplifies an output signal of the infrared radiation receiving portion 11. The second signal amplifier 22 amplifies an output signal of the thermistor 12.

In the main board 30, the third signal amplifier 31 amplifies an output signal of the first signal amplifier 21. The AD converter 32 converts an output signal of the first signal amplifier 21 into a digital signal, and gives the digital signal to the CPU 34 as a detected temperature of the object to be measured.

The AD converter 33 converts an output signal of the second signal amplifier 22 into a digital signal and gives the digital signal to the CPU 34 as an inner temperature of the thermopile 10.

The storing unit 35 stores information about the thermopile 10 and arithmetic expression with which the CPU 34 calculates temperature of the object to be measured. The information about the thermopile 10 includes, for example, gain and offset of the infrared radiation receiving portion 11, gain and offset of the thermistor 12, and the range of measurement temperature and temperature scale of the thermopile.

The main body portion 100B gives an emissivity and a check signal, described later, of the object to be measured to the CPU 34 through the cable 80 and the communication circuit 42. The CPU 34 calculates an actual temperature of the object to be measured (hereinafter, referred to as a measured temperature) according to a detected temperature given from the AD converter 32, an inner temperature given from the AD converter 33, an emissivity given from the main body portion 100B, and various information and the arithmetic expression stored into the storing unit 35. The CPU 34 gives the measured temperature to the main body portion 100B through the communication circuit 42 and the cable 80.

The CPU 34 feedback controls the gain of the third signal amplifier 31 according to the level of the output signal of the AD converter 32.

The CPU 34 controls the operations of the indication light 36, the laser driving circuit 37, and the laser driving circuit 43 of the power supply board 40. The indication light 36 shows an ON/OFF state of the check signal while lighting on/off according to a control of the CPU 34. The laser driving circuit 37 drives the laser diode 60 according to the control of the CPU 34.

In the power supply board 40, the power supply circuit 41 supplies the power from the main body portion 100B to the respective components of the head portion 100A through the cable 80.

The communication circuit 42 and the laser driving circuit 43 are both connected to the CPU 34 of the main board 30 through the junction board 50.

The communication circuit 42 communicates with the CPU 34 and the main body portion 100B through the cable 80, as mentioned above. The laser driving circuit 43 drives the laser diode 70 according to the control of the CPU 34. The laser beams emitted from the laser diodes 60 and 70 are radiated at a measurement position of the object to be measured.

As illustrated in FIG. 3, the main body portion 100B includes a power supply circuit 91, a communication circuit 92, CPU 93, a display unit 94, a storing unit 95, an operation setting unit 96, an external output circuit 97, and an analog output circuit 98.

The cable 80 is connected to the power supply circuit 91 and the communication circuit 92. The power supply circuit 91 has a power source such as battery and supplies its power to the respective components of the main body portion 100B and the head portion 10A. The communication circuit 92 communicates with the CPU 93 and the head portion 100A through the cable 80.

The storing unit 95 stores the emissivity of the object to be measured, the arithmetic expression, and the threshold for judgment. A user can set the emissivity and threshold of the object to be measured while operating the operation setting unit 96. The set emissivity and threshold are stored into the storing unit 95.

The CPU 93 controls the operations of the respective components of the main body portion 100B. The CPU 93 compares the measured temperature given by the head portion 100A with the threshold stored into the storing unit 95 and supplies the result to the cable 81 through the external output circuit 97 as a check signal.

The check signal turns into an ON state, for example, when the measured temperature is higher than the threshold (for example, high level) and turns into an OFF state when the measure temperature is lower than the threshold (for example, low level).

The CPU 93 supplies the measured temperature given by the head portion 100A to the cable 81 through the external output circuit 97 and supplies the analog signal corresponding to the measured temperature to the cable 81 through the analog output circuit 98.

According to this, the radiation thermometer 100 according to the embodiment can display and output the measured temperature of the object to be measured as well as display and output the check result (ON state or OFF state) about whether the measured temperature is higher than the threshold or not.

(2) Schematic Structure of Head Portion of Radiation Thermometer

Figure 4:
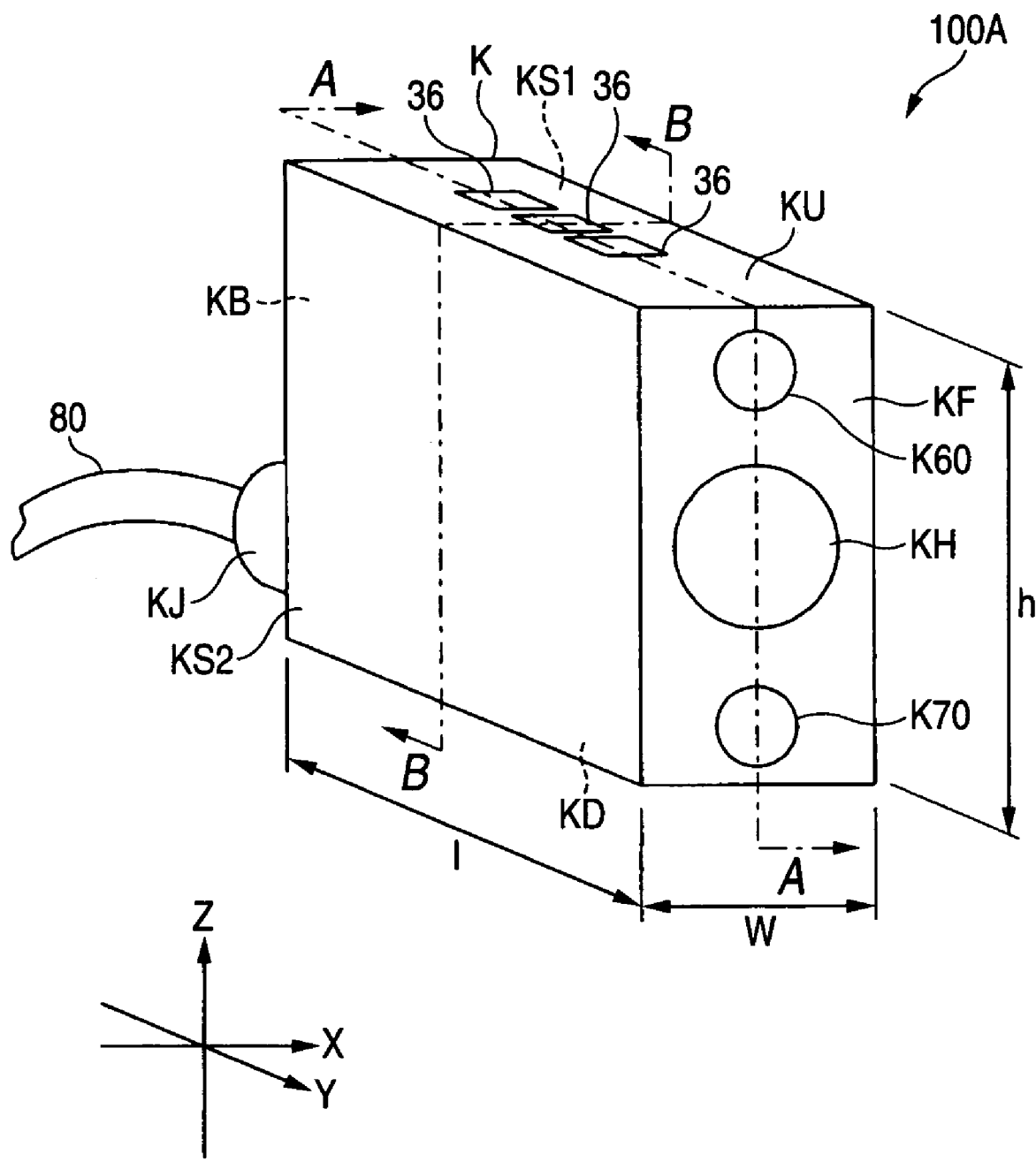
FIG. 4 is a view for use in describing the basic structure of the head portion of the radiation thermometer according to the first embodiment.
Figure 5:
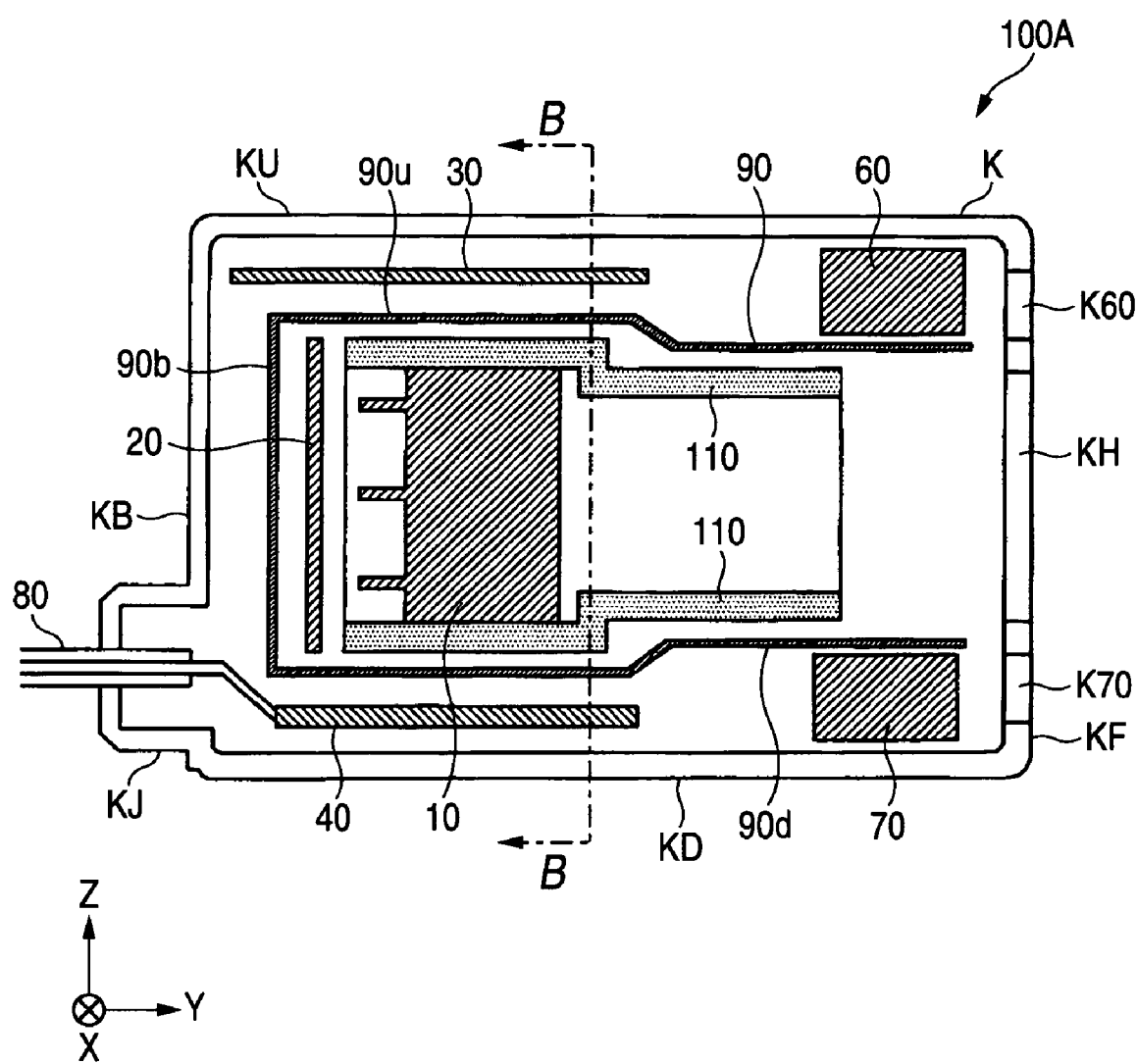
FIG. 5 is a view for use in describing the basic structure of the head portion of the radiation thermometer according to the first embodiment.
Figure 6:
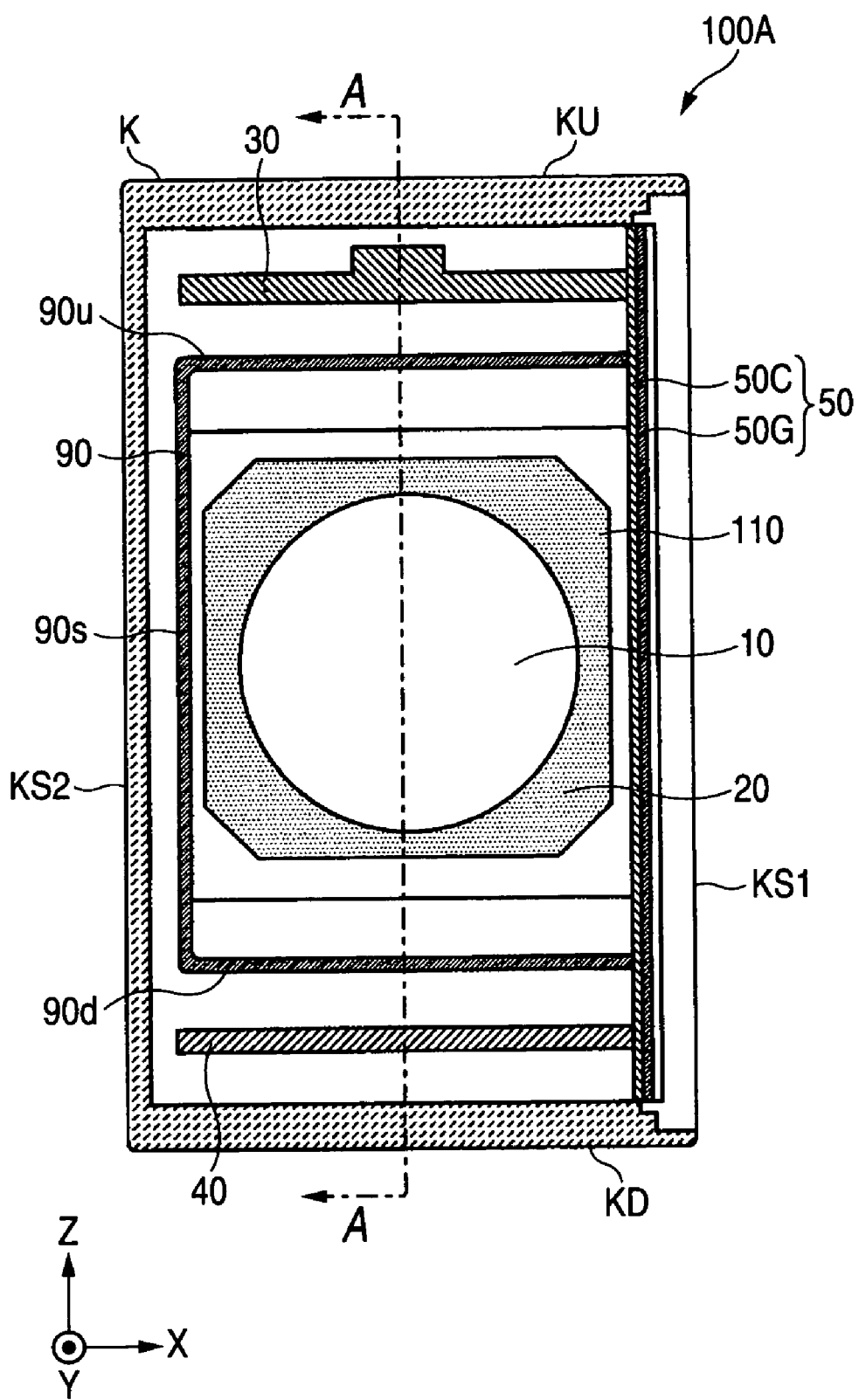
FIG. 6 is a view for use in describing the basic structure of the head portion of the radiation thermometer according to the first embodiment.

FIG. 4 to FIG. 6 are views for use in describing the basic structure of the head portion 100A of the radiation thermometer 100 according to the first embodiment. FIG. 4 shows an appearance perspective view of the head portion 10A. FIG. 5 shows a schematic cross-sectional view taken along the line A-A of FIG. 4, and FIG. 6 shows a schematic cross-sectional view taken along the line B-B of FIG. 4.

The respective components of the head portion 100A are built in a substantially rectangular head casing K. The head casing K has an upper surface KU, a down surface KD, a front surface KF, a back surface KB and side surfaces KS1 and KS2.

In the following description, as indicated by the arrows X, Y, and Z in FIG. 4, a direction perpendicular to the side surfaces KS1 and KS2 is called an X-direction, a direction perpendicular to the front surface KF and the back surface KB is called a Y-direction, and a direction perpendicular to the upper surface KU and the down surface KD is called a Z-direction. The directions will be similarly defined in the figures following FIG. 4.

In FIG. 4, the front surface KF of the head casing K is provided with an infrared radiation concentrating unit KH and laser radiating units K60 and K70, its upper surface KU is provided with the indication light 36 formed by the light emitting diode, and its back surface KB is provided with a cable junction KJ. Since the indication light 36 is located on its upper surface KU, a user can recognize the lighting on/off state or blinking state of the indication light 36 easily.

The infrared radiation concentrating unit KH takes in the infrared radiation radiated from the object to be measured. Laser beams generated by the laser diodes 60 and 70 in FIG. 2 are radiated at a measurement position respectively through the laser radiating units K60 and K70. The detailed structure and operation will be described later.

The cable junction KJ has the cable 80 connected there. This cable 80 is connected to the main body portion 100B as mentioned above.

The size of the head portion 100A of the radiation thermometer 100 according to the embodiment is, by way of example, as follows. In FIG. 4, the height h of the head portion 100A is about 34 mm, the width w is about 20 mm, and the depth l is about 48 mm.

As illustrated in FIG. 5 and FIG. 6, the thermopile 10 of a substantially cylindrical shape in parallel to the Y-direction, inserted into the substantially cylindrical thermopile holder 110 in parallel to the Y-direction, is arranged almost in the middle of the head portion 10A. At the back surface KB side of the thermopile 10, the preamplifier board 20 is arranged near the thermopile 10 in parallel to the back surface KB.

The thermopile holder 110 used as the peripheral member of the thermopile 10 is used in order to make the inner temperature of the thermopile 10 almost equal to its peripheral temperature. Thus, the thermopile holder 110 has to be made of a material of high heat conductivity. The details will be described later.

Further, a heat diffusion member 90 is arranged so as to surround the thermopile 10, the thermopile holder 110, and the preamplifier board 20. The heat diffusion member 90 has a substantially C-shaped cross section along the YZ plane of the head portion 100A as illustrated in FIG. 5 and it also has a substantially C-shaped cross section along the XZ plane as illustrated in FIG. 6.

Specifically, the heat diffusion member 90 has an upper surface 90u, a down surface 90d, a back surface 90b, and a side surface 90s, and the heat diffusion member 90 is open on the side of the front surface KF of the head portion 100A and on the side of one side surface KS1.

This induces the infrared radiation radiated from the object to be measured to the infrared radiation receiving portion 11 of the thermopile 10 (refer to FIG. 2) through the infrared radiation concentrating unit KH.

The heat diffusion member 90 is made of a material of high heat conductivity. Preferably, the heat diffusion member 90 is formed, in particular, by metal such as copper, silver, aluminum, iron, or gold. In the embodiment, the heat diffusion member 90 is formed by coating copper with nickel. In this case, the copper can achieve a higher heat conductivity and the coated nickel can prevent from oxidization of copper as well as improve corrosion resistance.

As illustrated in FIG. 6, the junction board 50 is placed at the opening position on the side of the one side surface KS1 of the heat diffusion member 90 in parallel to the side surface KS1. As mentioned above, the junction board 50 includes the wired surface 50C and the ground conductive surface 50G. The wired surface 50C is arranged on the side of the thermopile 10 and the ground conductive surface 50G is arranged on the side of the side surface KS1.

Similarly to the heat diffusion member 90, the ground conductive surface 50G is made of a material of high heat conductivity, preferably, a metal such as copper, silver, aluminum, iron, or gold. In the embodiment, the material of the ground conductive surface 50G is the same as that of the heat diffusion member 90.

According to this, the thermopile 10, the thermopile holder 110, and the preamplifier board 20 are surrounded by the diffusion member 90 and the ground conductive surface 50G of high heat conductive material in all the directions other than the front surface KF. The thermopile holder 110 has a rectangular shape in the Y-direction but does not protrude from the opening of the heat diffusion member 90 on the front surface KF.

As illustrated in FIG. 5, the main board 30 and the laser diode 60 are arranged between the upper surface KU of the head casing K and the upper surface 90u of the heat diffusion member 90. The laser diode 60 is adjacent to the laser radiating unit K60 and positioned at a predetermined distance from the thermopile 10. Thus, the laser beam generated by the laser diode 60 is efficiently radiated at the object to be measured through the laser radiating unit K60. The main board 30 is positioned near the side of the back surface KB of the head casing K in parallel to the upper surface KU.

The power supply board 40 and the laser diode 70 are positioned between the down surface KD of the head casing K and the down surface 90d of the heat diffusion member 90. The laser diode 70 is adjacent to the laser radiating unit K70 and positioned at a predetermined distance from the thermopile 10. Thus, the laser beam generated by the laser diode 70 is efficiently radiated at the object to be measured through the laser radiating unit K70. The power supply board 40 is arranged near the side of the back surface KB of the head casing K in parallel to the down surface KD.

The thermopile 10 and the thermopile holder 110 are arranged out of contact with the heat diffusion member 90. The main board 30, the power supply board 40, and the laser diodes 60 and 70 are also arranged out of contact with the heat diffusion member 90. Thus, each air layer exists between the heat diffusion member 90 and the thermopile holder 110 with the thermopile 10 inserted there and between the heat diffusion member 90 and each of the main board 30, the power supply board 40, and the laser diodes 60 and 70. These air layers work as heat insulating layers. The cable 80 is electrically connected to the power supply board 40.

As mentioned above, in the radiation thermometer 100 according to the embodiment, the laser beams generated by the two laser diodes 60 and 70 are radiated at the object to be measured through the laser radiating units K60 and K70 of the head casing K. Thus, a measurement position is indicated by the laser beams. In particular, when the two laser diodes 60 and 70 are used, a more accurate temperature can be measured by properly setting the indication format of a measurement position by the both laser beams. The indication format of a measurement position will be described later.

In the embodiment, the thermopile 10 is arranged near the preamplifier board 20. This can shorten a wiring between the thermopile 10 and the preamplifier board 20. Thus, a feeble output signal of the thermopile 10 is hardly affected by noise. As a result, the CPU 34 can calculate the temperature of the object to be measured with high accuracy.

In the embodiment, the heat diffusion member 90 and the ground conductive surface 50G are arranged so as to surround the thermopile 10 and the preamplifier board 20 within the head casing K of the head portion 10A. The main board 30, the power supply board 40, and the laser diodes 60 and 70 are arranged between the heat diffusion member 90 and the head casing K.

In this case, since there exists the air layer working as the heat insulating layer between the thermopile 10 and each of the main board 30, the power supply board 40, and the laser diodes 60 and 70, the heat generated by the main board 30, the power supply board 40, and the laser diodes 60 and 70 is hardly transmitted to the thermopile 10.

The heat transmitted from the main board 30, the power supply board 40, and the laser diodes 60 and 70 to the heat diffusion member 90 is spread over the heat diffusion member 90 diffusively. In this way, the heat is hardly transmitted to the thermopile 10, and the atmospheric temperature within the head casing K is kept substantially even.

That can prevent from local heat transmission to the thermopile 10 and make the inner temperature of the thermopile 10 substantially equal to the temperature of the peripheral member (for example, the thermopile holder 110) of the thermopile 10. As a result, the CPU 34 can calculate the temperature of the object to be measured with high accuracy.

As mentioned above, in the head portion 100A in the radiation thermometer 100 according to the embodiment, since the above arrangement of the heat diffusion member 90 and the ground conductive surface 50G can prevent from local heat transmission to the thermopile 10, the respective components can be arranged adjacently to each other within the head casing K.

Since the laser diodes 60 and 70 are arranged in an open space around the passage of infrared radiation within the head casing K and not adjacent to the thermopile 10, local heat transmission to the thermopile 10 can be prevented. Further, it can prevent from upsizing of the head portion 100A caused by the provision of the laser diodes 60 and 70.

As a result, it is possible to calculate the temperature of the object to be measured with high accuracy and downsize the whole radiation thermometer 100.

(3) Detailed Structure of Head Portion of Radiation Thermometer

A concrete structure and operation of the radiation thermometer 100 according to the embodiment will be described hereinafter.

Figure 8:
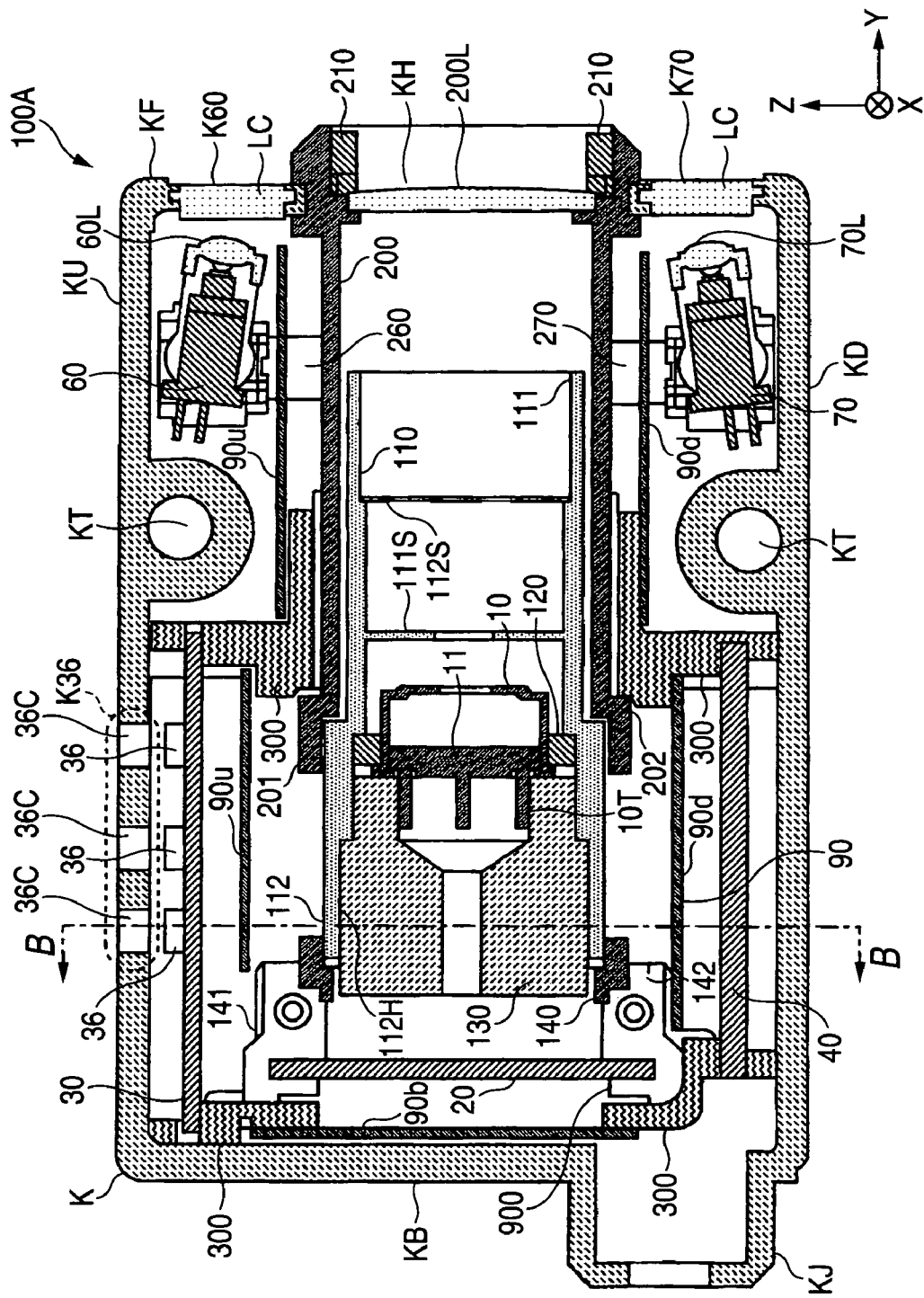
FIG. 8 is a view for use in describing the detailed structure of the head portion of the radiation thermometer according to the first embodiment.
Figure 9:
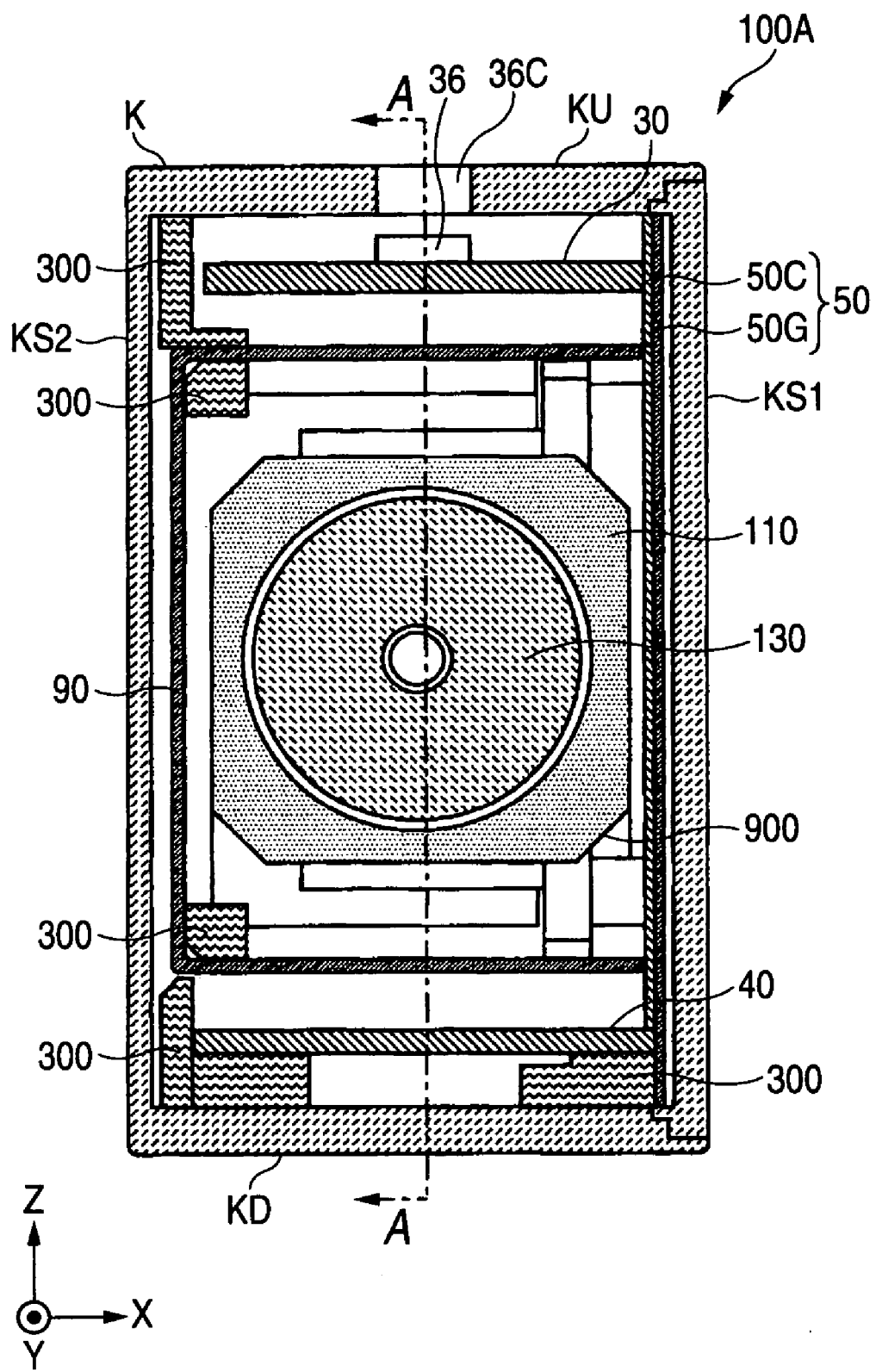
FIG. 9 is a view for use in describing the detailed structure of the head portion of the radiation thermometer according to the first embodiment.

Each of FIG. 7 to FIG. 9 shows the detailed structure of the head portion 100A of the radiation thermometer 100 according to the first embodiment, and FIG. 10 to FIG. 16 are perspective views each showing the assembly procedure of the head portion 100A of FIG. 7.

FIG. 7A shows a front view (front surface) of the head portion 10A, and FIG. 7B shows a lateral side view of the head portion 10A. FIG. 8 is a detailed cross-sectional view taken along the line A-A in FIG. 7A, and FIG. 9 is a detailed cross-sectional view taken along the line B-B in FIG. 7B. In each figure following FIG. 7, the cable 80 connected to the head portion 100A is omitted.

In the head portion 100A of this example, through holes KT are respectively located in the upper and the lower portions of the respective side surfaces KS1 and KS2 of the head casing K, as illustrated in the lateral side view of FIG. 7B. These through holes KT are used to fix the head portion 100A at a desired position.

As illustrated in FIG. 8, openings 36C for passing the beams of the indication light 36 are formed on the upper surface KU. The infrared radiation concentrating unit KH on the front surface KF is formed by the infrared radiation concentrating lens 200L, and the laser radiating units K60 and K70 are respectively formed by the laser lens covers LC.

As illustrated in FIG. 8 and FIG. 9, the thermopile 10 is supported by the thermopile holder 110, within the head casing K. The thermopile 10 will be mounted into the thermopile holder 110 in the following way.

Figure 10:
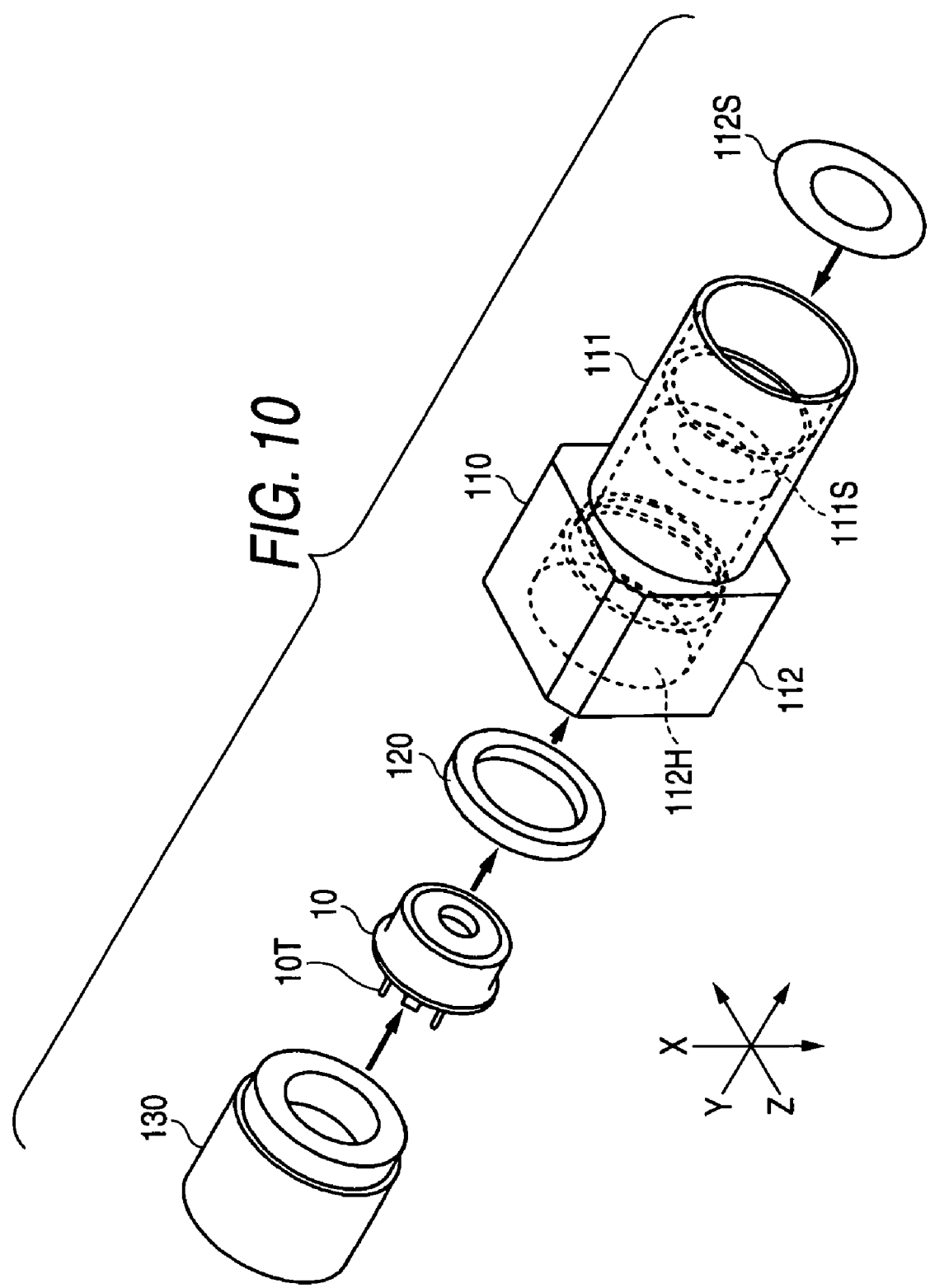
FIG. 10 is a perspective view for use in describing the assembly procedure of the head portion of FIG. 7.

FIG. 10 shows a state of mounting the thermopile 10 into the thermopile holder 110.

As illustrated in FIG. 10, the thermopile holder 110 has a cylindrical portion 111 and a fixing block portion 112. The fixing block portion 112 has a substantially rectangular shape and the cylindrical portion 111 is integrated with the fixing block portion 112 in a way of extending in the Y-direction from its one surface parallel to the XZ plane.

A thermopile housing hole 112H is bored in the fixing block portion 112. The thermopile housing hole 112H communicates with the inner space of the cylindrical portion A first circular slit member 111S is formed in the inner surface of the cylindrical portion 111. A second circular slit member 112S is attached to the front side of the first slit member 111S of the cylindrical portion 111.

As illustrated in FIG. 8, the diameter of the circular slit (bore) formed in the first slit member 111S is smaller than the diameter of the circular slit (bore) formed in the second slit member 112S. The first slit member 111S and the second slit member 112S restrict the passage of the infrared radiation so that the infrared radiation concentrated by the infrared radiation concentrating lens 200L can enter the thermopile 10.

According to this, the infrared radiation externally entering the head portion 100A through the infrared radiation concentrating lens 200L can enter the infrared radiation receiving portion 11 of the thermopile 10 without being reflected by various members within the head portion 100A (the inner surface of the thermopile holder 110 and a lens holder described later). As a result, only the infrared radiation directly radiated from the object to be measured enters the infrared radiation receiving portion 11.

As illustrated in FIG. 10, a fixing ring 120, the thermopile 10, and a fixing rear cap 130 are sequentially inserted into the thermopile housing hole 112H of the fixing block portion 112. Thus, the thermopile 10 is fixed within the thermopile holder 110, as illustrated in FIG. 8.

The thermopile holder 110, the second slit member 112S, and the fixing rear cap 130 are made of a material of high heat conductivity and high electric conductivity such as copper, silver, aluminum, iron, or gold. This makes it possible to keep the temperature around the thermopile 10 even and to make the inner temperature of the thermopile 10 substantially equal to the temperature of the thermopile holder 110, the second slit member 112S, and the fixing rear cap 130.

Even when the infrared radiation radiated from the peripheral members (the thermopile holder 110, the second slit member 112S, and the like) of the thermopile 10 enters the infrared radiation receiving portion 11, the CPU 34 can calculate the infrared radiation amount of the peripheral members of the thermopile 10 according to the inner temperature of the thermopile 10. Further, it can subtract the infrared radiation amount of the peripheral members of the thermopile 10 from all the infrared radiation amount entering the infrared radiation receiving portion 11. As a result, it is possible to measure the infrared radiation amount only for the object to be measured accurately, of all the infrared radiation amount entering the infrared radiation receiving portion 11, hence to get an accurate measured temperature.

Since the thermopile holder 110, the second slit member 112S, and the fixing rear cap 130 are formed by the material of high electric conductivity, the thermopile 10 which generates a feeble output signal can be electrically shielded from the external electromagnetic environment, by grounding the respective members.

As mentioned above, the fixing ring 120 is inserted into the thermopile housing hole 112H. By adjusting the form and the material of the fixing ring 120, it is possible to adjust the heat transmission condition from the thermopile holder 110 to the thermopile 10 and a distance between the thermopile 10 and the infrared radiation concentrating lens 200L.

As illustrated in FIG. 8, a lens holder 200 and an amplifier attachment spacer 140 are attached to the thermopile holder 110 with the thermopile 10 inserted there.

The lens holder 200 and the amplifier attachment spacer 140 are attached to the thermopile holder 110 in the following way.

Figure 11:
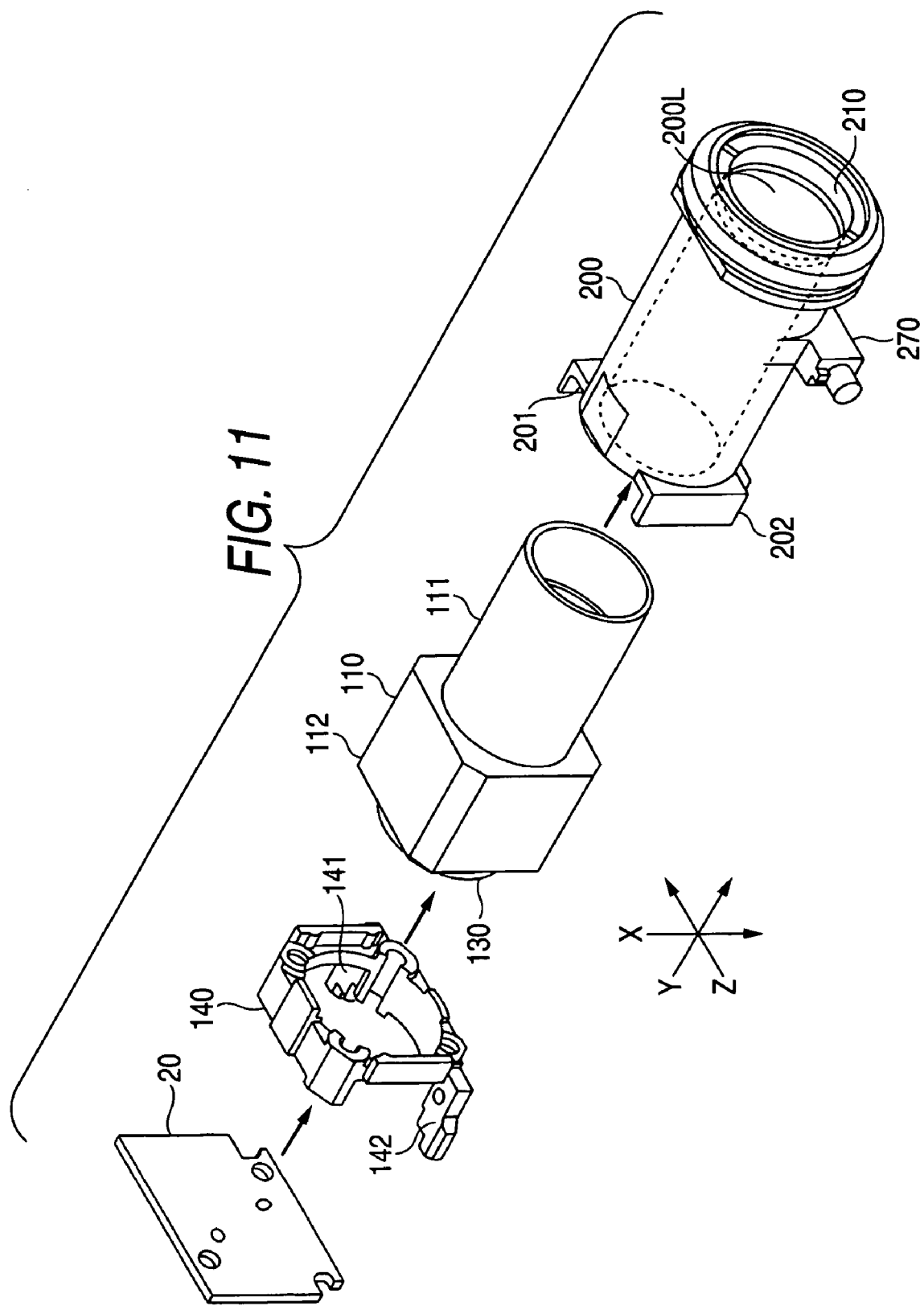
FIG. 11 is a perspective view for use in describing the assembly procedure of the head portion of FIG. 7.
Figure 12:
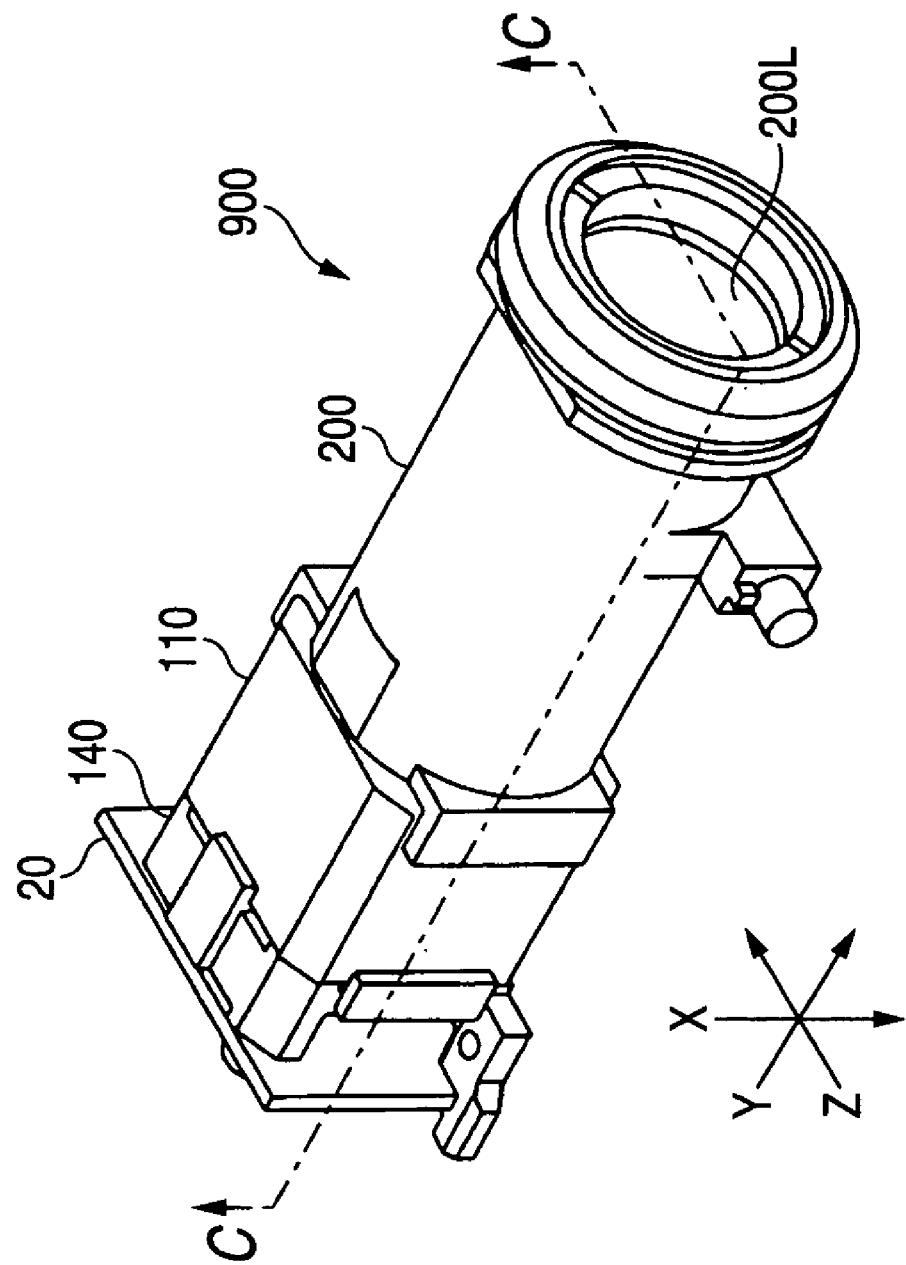
FIG. 12 is a perspective view for use in describing the assembly procedure of the head portion of FIG. 7.
Figure 13:
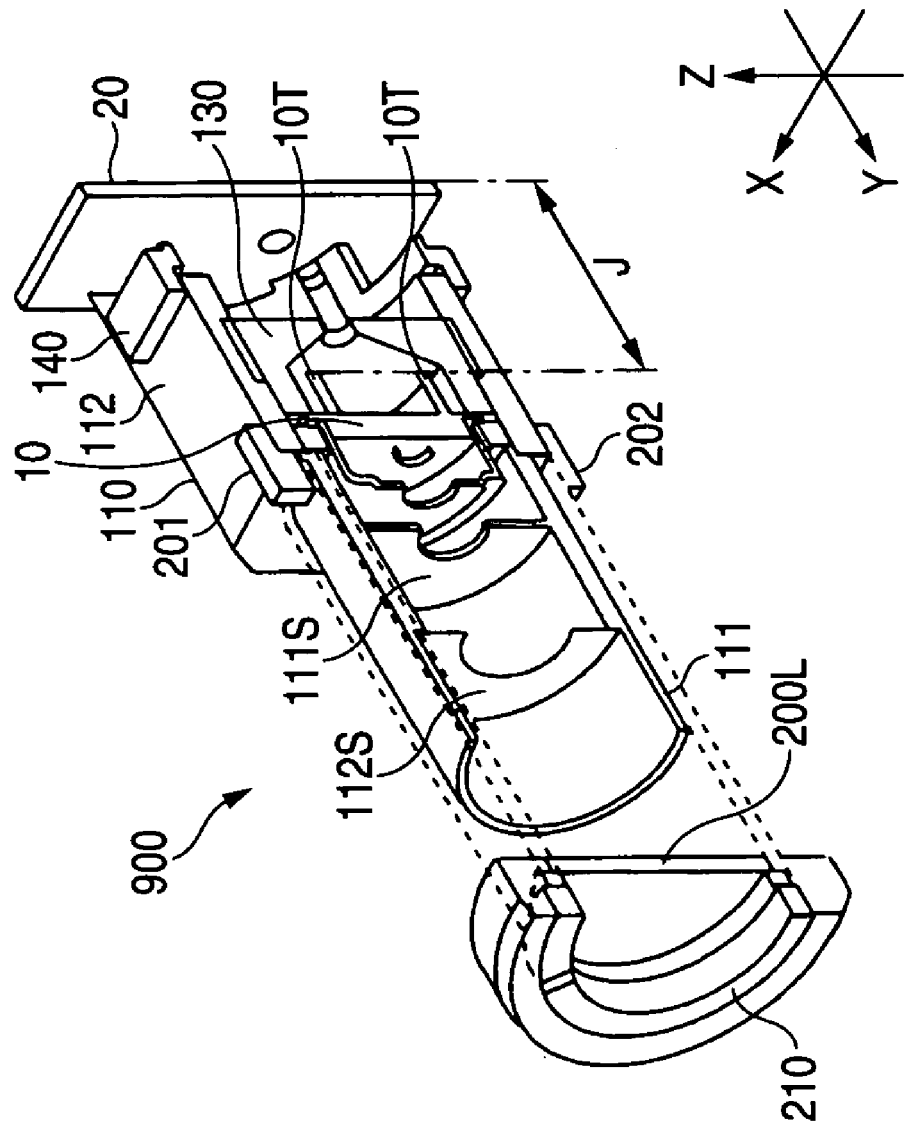
FIG. 13 is a perspective view for use in describing the assembly procedure of the head portion of FIG. 7.

FIG. 11 shows the state of attaching the lens holder 200 and the amplifier attachment spacer 140 to the thermopile holder 110. FIG. 12 shows an appearance of the infrared radiation concentrating unit completed after mounting the lens holder 200 and the amplifier attachment spacer 140 into the thermopile holder 110. FIG. 13 is a cross-sectional view of the infrared radiation concentrating unit of FIG. 12 taken along the line C-C. FIG. 13 shows one portion of the lens holder 200 in a dotted line, for the sake of easy understanding.

As illustrated in FIG. 11, the infrared radiation concentrating lens 200L is attached to the front end of the lens holder 200 by the lens fixing ring 210. A laser supporting pole 260 (refer to FIG. 8) and a laser supporting pole 270 are formed on the outer surface of the lens holder 200 in the Z-direction in a protruding way. The laser supporting pole 260 supports the laser diode 60 and the laser supporting pole 270 supports the laser diode 70.

Holder fixing pieces 201 and 202 are formed at the rear end of the lens holder 200. The lens holder 200 is attached to the cylindrical portion 111 of the thermopile holder 110. Thus, the thermopile holder 110 and the lens holder 200 are fixed.

The amplifier attachment spacer 140 is attached to the rear end of the thermopile holder 110. The amplifier attachment spacer 140 has two board holders 141 and 142. These board holders 141 and 142 support the preamplifier board 20 (refer to FIG. 8 and FIG. 12). Thus, the infrared radiation concentrating unit 900 is completed.

The lens holder 200 and the amplifier attachment spacer 140 are formed by a material of, for example, resin. When using, in particular, a resin of low heat conductivity, the heat generated by the laser diodes 60 and 70 is difficult to transmit to the lens holder 200. This can reduce the transmission of the heat generated by the laser diodes 60 and 70 to the thermopile 10.

In the infrared radiation concentrating unit 900, a distance J between a plurality of terminals 10T of the thermopile 10 and the preamplifier board 20 is shortened, as illustrated in FIG. 13. According to this, the wiring length between the terminals 10T of the thermopile 10 and the preamplifier board 20 can be shortened.

As illustrated in FIG. 8 and FIG. 9, the infrared radiation concentrating unit 900 is fixed within the head casing K by a main frame 300. The main frame 300 supports the main board 30 and the power supply board 40.

Figure 14:
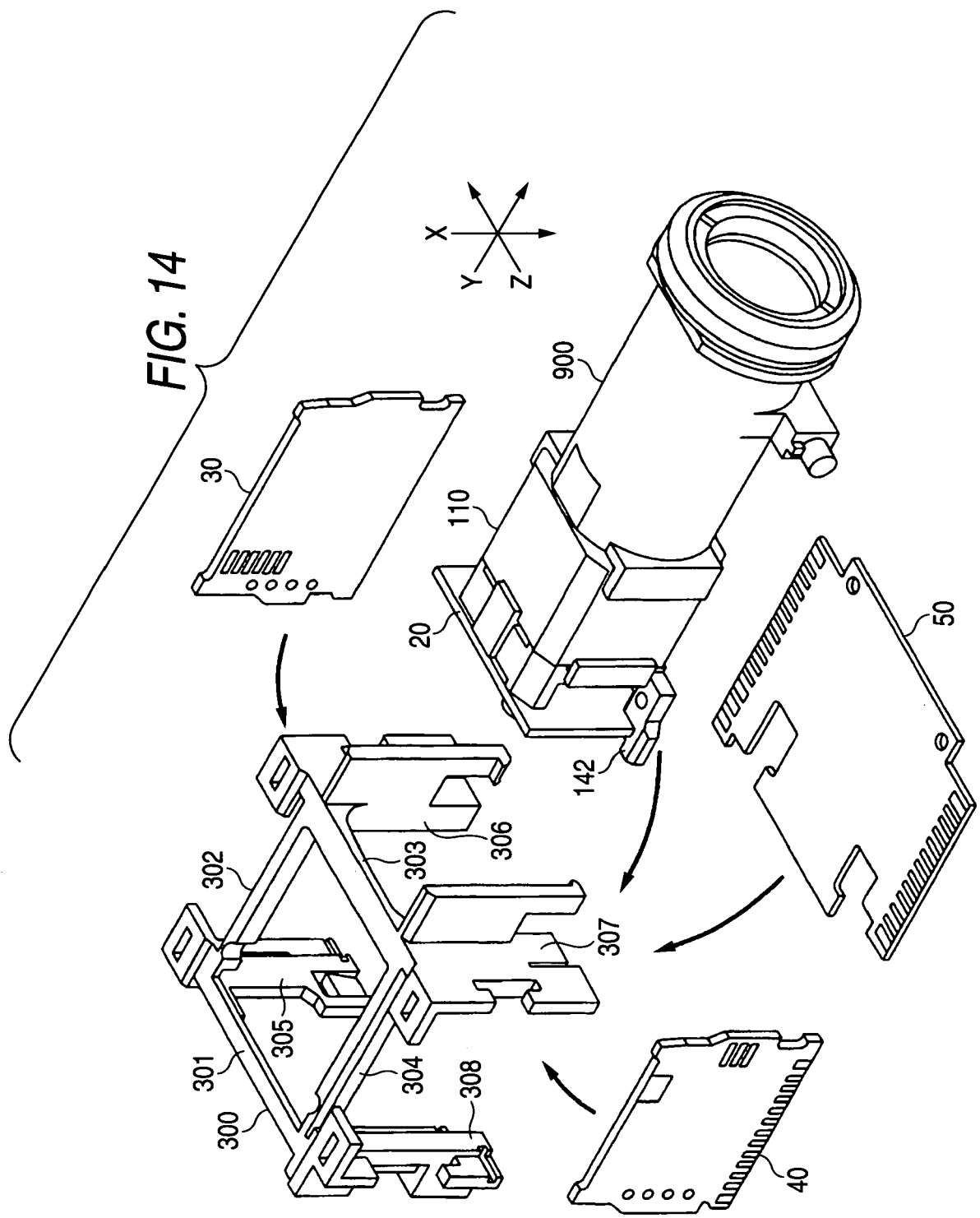
FIG. 14 is a perspective view for use in describing the assembly procedure of the head portion of FIG. 7.

FIG. 14 shows the state of installing the infrared radiation concentrating unit 900 into the main frame 300 and attaching the main board 30 and the power supply board 40 to the main frame 300.

As illustrated in FIG. 14, the main frame 300 is integrally formed by four supporters 301, 302, 303, and 304 and four holders 305, 306, 307, and 308. The four supporters 301 to 304 are mutually connected into a substantial square and the holders 305 to 308 are respectively jointed to the junctions of the supporters perpendicularly.

The main board 30 is attached to the supporter 302 and the holders 305 and 306, the power supply board 40 is attached to the supporter 304 and the holders 307 and 308, and the thermopile holder 110 of the infrared radiation concentrating unit 900 is inserted into a space formed by the supporter 303 and the holders 306 and 307.

The thermopile holder 110 of the infrared radiation concentrating unit 900 is accommodated into a space surrounded by the supporters 301 to 304 and the holders 305 to 308. The board holders 141 and 142 (refer to FIG. 11) of the infrared radiation concentrating unit 900 are attached to the holders 305 and 308.

The junction board 50 is fixed by the main frame 300. The junction board 50 is electrically connected to the main board 30 and the power supply board 40 fixed to the main frame 300, within the head casing K.

With the main board 30, the power supply board 40, and the infrared radiation concentrating unit 900 fixed to the main frame 300, the main board 30 is electrically connected to the preamplifier board 20 through a flexible wiring circuit board not illustrated.

The assembled body including the main board 30, the power supply board 40, the junction board 50, the main frame 300, and the infrared radiation concentrating unit 900 is accommodated into the head casing K. At this time, the heat diffusion member 90 and the laser diodes 60 and 70 also are further attached to the assembled body.

Figure 15:
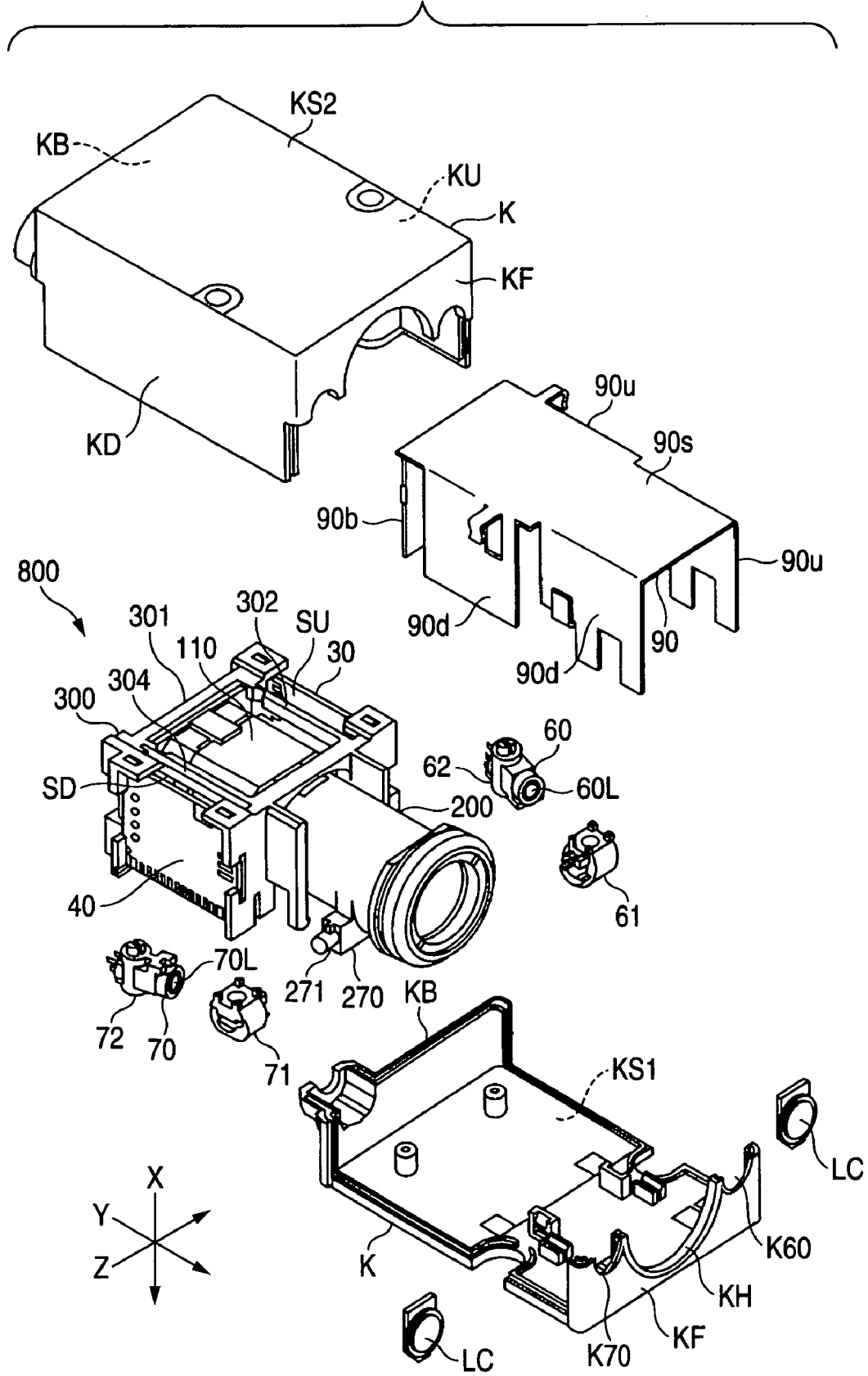
FIG. 15 is a perspective view for use in describing the assembly procedure of the head portion of FIG. 7.

FIG. 15 shows the state of accommodating the assembled body of FIG. 14 into the head casing K. FIG. 16 shows the state of mounting the laser diodes 60 and 70 in the assembled body 800.

As illustrated in FIG. 15 and FIG. 16, the laser diodes 60 and 70 are mounted in the assembled body 800. This will be performed as follows.

Figure 16A:
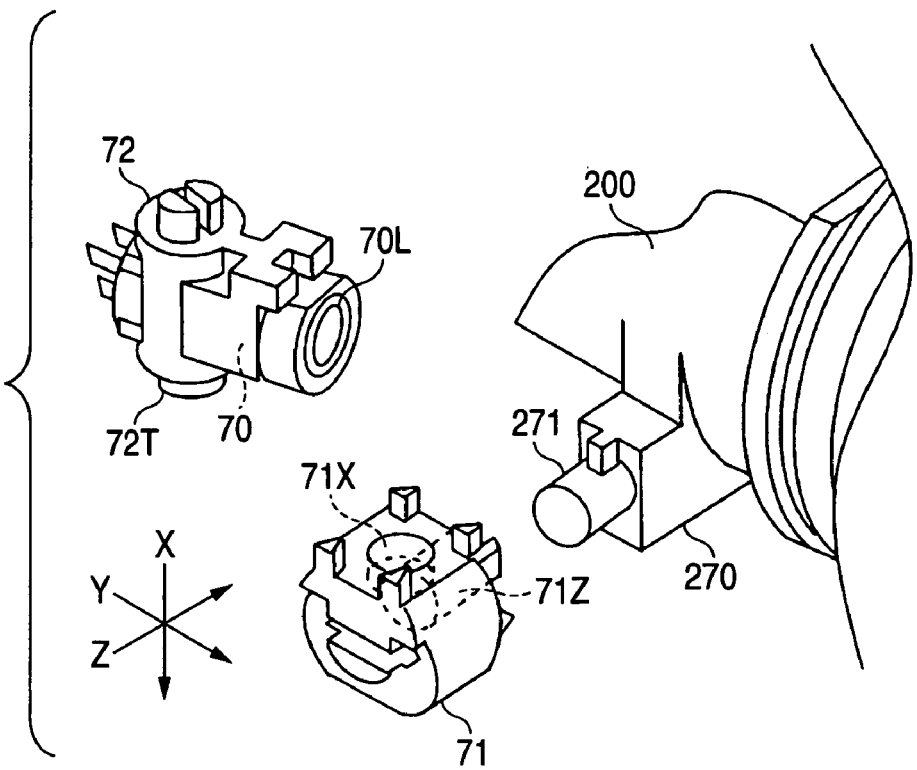
FIGS. 16A and 16B are perspective views for use in describing the assembly procedure of the head portion of FIG. 7.

A protruding portion 271 is formed extending from the end surface of the laser supporting pole 270 of the lens holder 200. As illustrated in FIG. 16A, a laser holding member 72 is joined to the protruding portion 271 through a joint member 71.

The joint member 71 has a bore 71X in the X-direction and a bore 71Z in the Z-direction. According to this, as illustrated in FIG. 16B, the joint member 71 is attached to the protruding portion 271 of the lens holder 200 rotatably in a direction of the arrow R1.

The laser holding member 72 holds the laser diode 70 and the laser lens 70L. As illustrated in FIG. 16A, the protruding portion 72T extending in the X-direction is formed on the laser holding member 72.

Figure 16B:
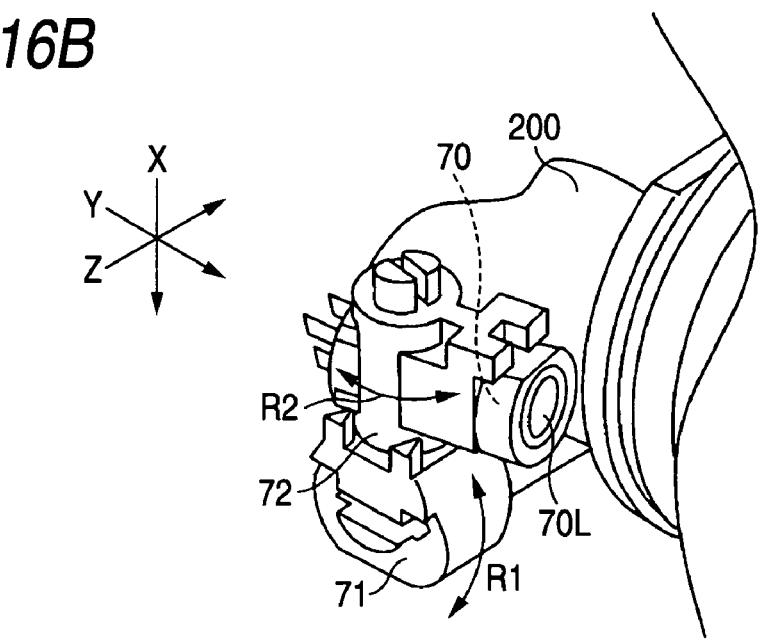

According to this, the laser holding member 72 is inserted into the bore 71X of the joint member 71 in a rotatable way in a direction of the arrow R2, as illustrated in FIG. 16B. As a result, the radiation direction of the laser beam generated by the laser diode 70 is easily adjusted.

Though the joint member 61 and the laser holding member 62 attached to the laser supporting pole 260 (refer to FIG. 8) of the lens holder 200 are not illustrated in FIG. 16, the structure of the joint member 61 and the laser holding member 62 is the same as that of the joint member 71 and the laser holding member 72. The joint member 61 and the laser holding member 62 are similarly inserted into the laser supporting pole 260.

The above heat diffusion member 90 is mounted in the assembled body 800 having the laser diodes 60 and 70.

There are a space SD between the supporter 304 of the main frame 300 and the power supply board 40 and a space SU between the supporter 302 of the main frame 300 and the main board 30, in the assembled body 800 in FIG. 15. One of the upper surface 90u and one of the down surface 90d of the heat diffusion member 90 are respectively inserted into the space SU and the space SD.

The heat diffusion member 90 is provided with cut-off portions in accordance with the laser supporting poles 260 and 270. At a time of attaching the heat diffusion member 90 to the assembled body 800, the upper surface 90u and the down surface 90d of the heat diffusion member 90 are arranged between the lens holder 200 and the laser diodes 60 and 70.

Thus, the upper surface, the down surface, the back surface and the one lateral side surface of the assembled body 800 are covered with the heat diffusion member 90 and the heat diffusion member 90 is arranged between the thermopile holder 110 and each of the main board 30, the power supply board 40, and the laser diodes 60 and 70.

At last, the assembled body 800 with the heat diffusion member 90 attached is accommodated into the head casing K including two members. In the above structure within the head casing K, the main board 30 and the power supply board 40 are electrically connected to the laser diode 60 and the laser diode 70 respectively, by the flexible wiring circuit board not illustrated.

FIG. 17 is a view showing the state of indicating a measurement position by the laser diodes 60 and 70 of FIG. 8. In the following description, the laser beams L1 and L2 are respectively radiated from the laser diodes 60 and 70 of the head portion 10A.

Figure 17A:
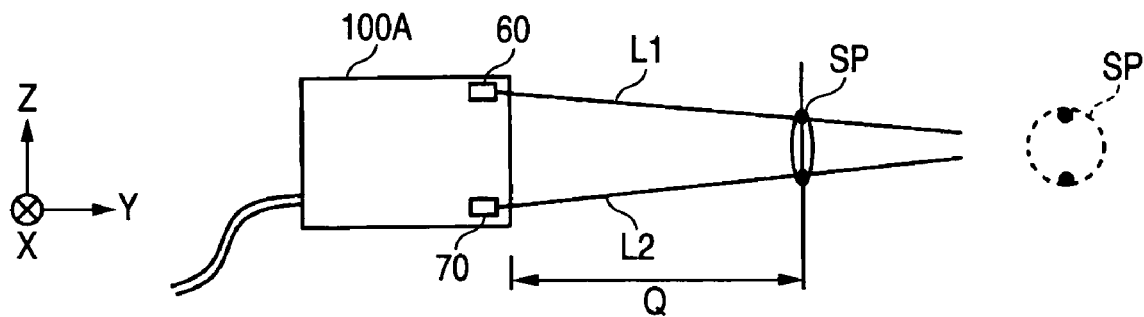
FIGS. 17A to 17C are views indicating the state of indicating the measurement position with the laser diode of FIG. 8.

For example, as illustrated in FIG. 17A, the laser beam L1 indicates the upper end of the measurement position SP and the laser beam L2 indicates the lower end of the measurement position SP. In this case, a user can easily understand the range of the measurement position SP.

Figure 17B:
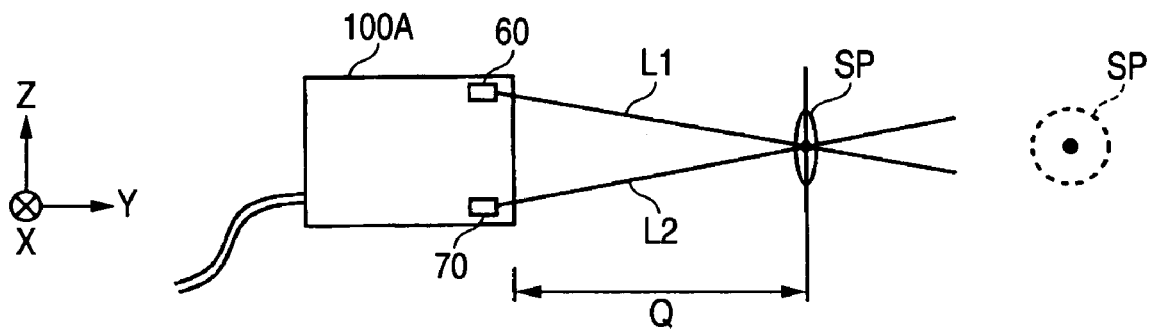

As illustrated in FIG. 17B, each angle of the laser diode 60 and the laser diode 70 is set so as to cross the laser beam L1 and the laser beam L2 at the center of the measurement position SP. In this case, a user can easily know whether the distance Q between the head portion 100A and the measurement position SP is proper or not.

Figure 17C:
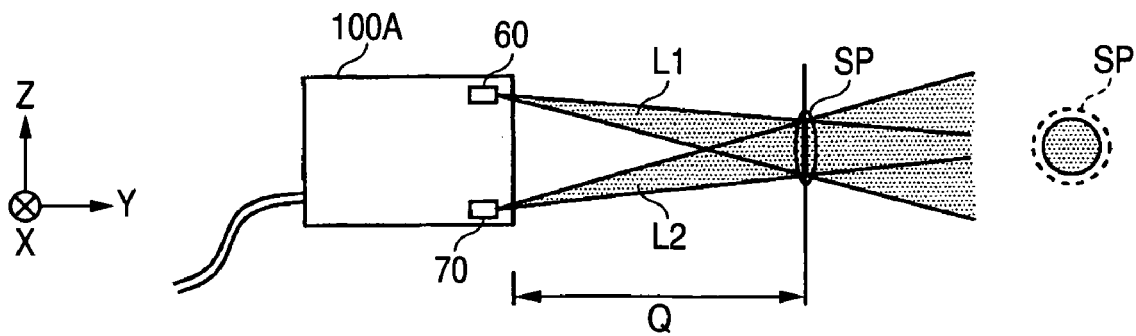

As illustrated in FIG. 17C, each angle of the laser diode 60 and the laser diode 70 is set so as to cross the laser beam L1 and the laser beam L2 at the center of the measurement position SP and at the same time, the laser beams L1 and L2 are spread to have a predetermined width. In this case, a user can easily know whether the distance Q between the head portion 100A and the measurement position SP is proper or not as well as the range of the measurement position SP.

In the radiation thermometer 100 according to the embodiment, each radiation direction of the laser beams L1 and L2 generated by the laser diodes 60 and 70 can be easily adjusted thanks to the structure of the head portion 100A shown in FIGS. 16A and 16B. The method of indicating the measurement position SP is not restricted to the examples of FIGS. 17A, 17B, and 17C.

SECOND EMBODIMENT

A radiation thermometer according to the second embodiment is different from the radiation thermometer 100 of the first embodiment in the following points. In the radiation thermometer according to the embodiment, the appearance shape of the head portion is the same as the head portion 100A of the radiation thermometer 100 according to the first embodiment.

Figure 18:
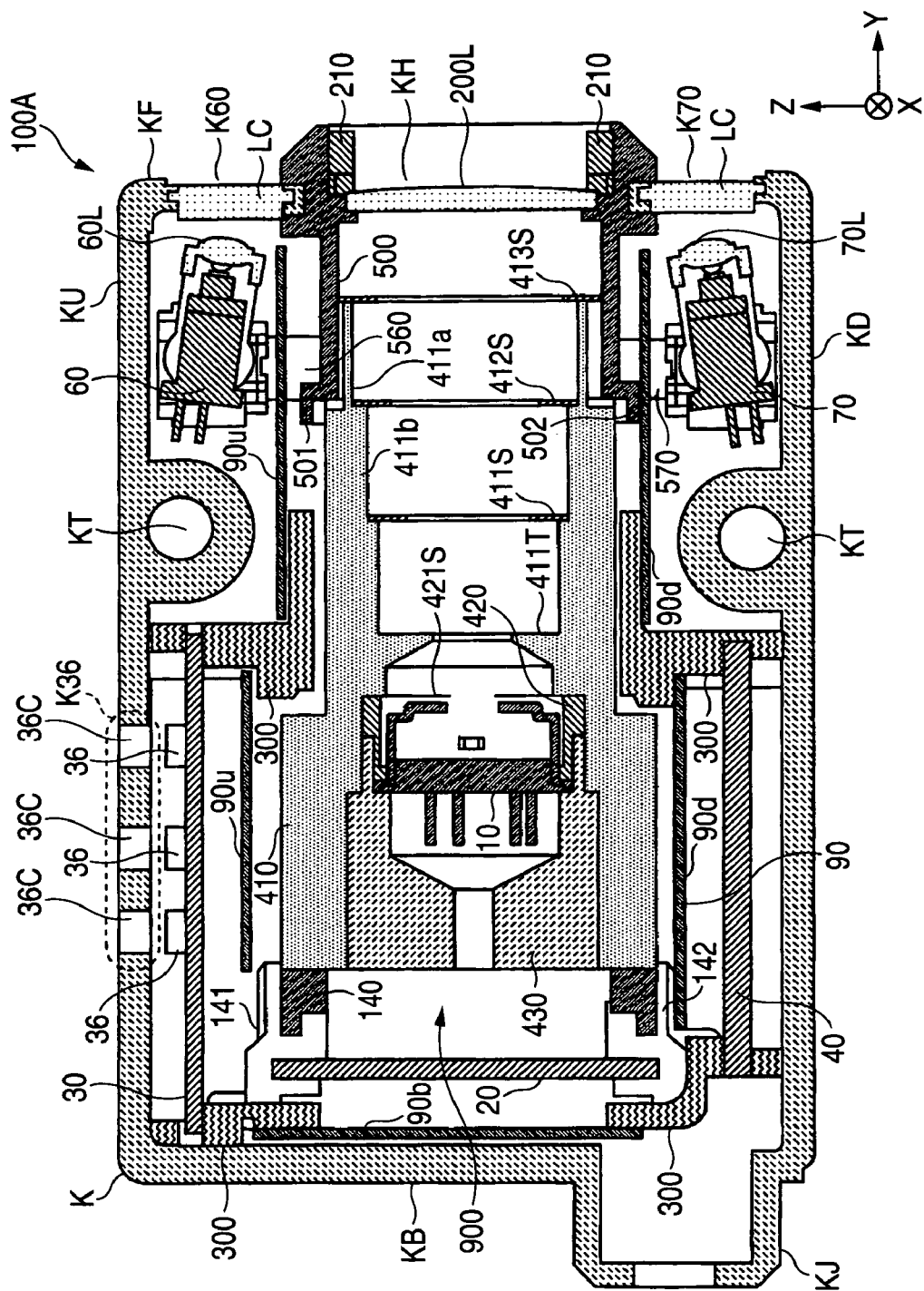
FIG. 18 is a detailed cross-sectional view of the head portion of the radiation thermometer taken along the YZ plane according to the second embodiment.
Figure 19:
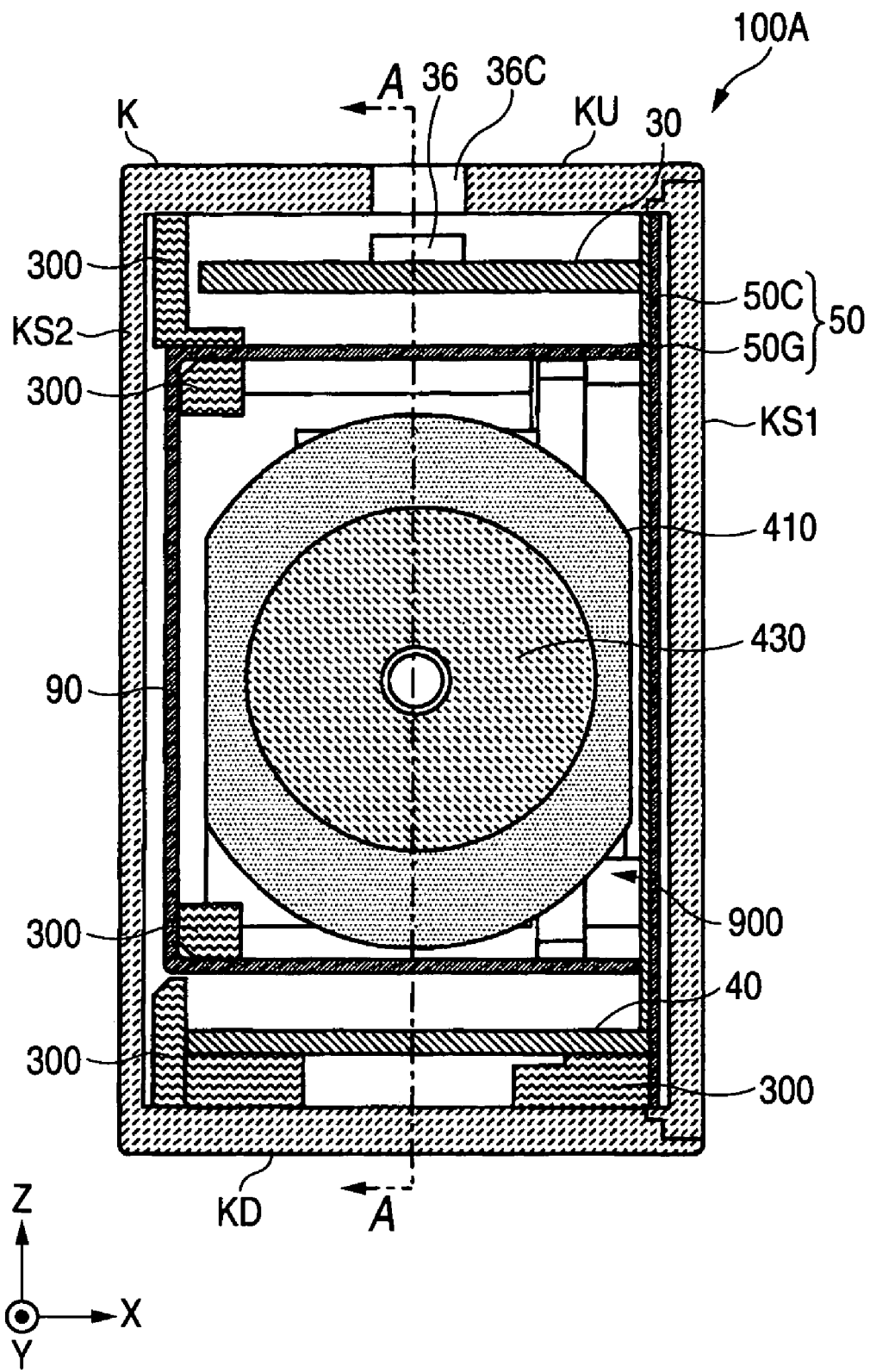
FIG. 19 is a detailed cross-sectional view of the head portion of the radiation thermometer taken along the XZ plane according to the second embodiment.

FIG. 18 is a detailed cross-sectional view of the head portion of the radiation thermometer taken along the YZ plane according to the second embodiment and it corresponds to the detailed cross-sectional view of FIG. 7A taken along the line A-A. FIG. 19 is a detailed cross-sectional view of the head portion of the radiation thermometer taken along the XZ plane according to the second embodiment and it corresponds to the detailed cross-sectional view of FIG. 7B taken along the line B-B.

As illustrated in FIG. 18 and FIG. 19, in the head portion 100A of the radiation thermometer of this embodiment, the structure of the infrared radiation concentrating unit 900 included in the head casing K is different from the structure of the infrared radiation concentrating unit 900 used for the first embodiment. The detailed structure of the infrared radiation concentrating unit 900 used for the embodiment will be described.

FIG. 20 is a view showing the state of assembling the infrared radiation concentrating unit 900 used for the head portion 100A of the radiation thermometer according to the second embodiment. In the following drawings (FIG. 20 to FIG. 24), the amplifier attachment spacer 140 (FIG. 18) and the preamplifier board 20 (FIG. 18) of the infrared radiation concentrating unit 900 are not illustrated.

As illustrated in FIG. 20, the thermopile holder 410 has a front cylindrical portion 411a, a rear cylindrical portion 411b, and a fixing block portion 412. The fixing block portion 412 is formed in a cylindrical shape along the Y-direction. The rear cylindrical portion 411b and the front cylindrical portion 411a are integrally formed in a way of extending from one surface parallel to the XZ plane of the fixing block portion 412 in the Y-direction.

The fixing block portion 412 is formed in that its thickness in the Z-direction is thicker than that in the X-direction in a cross-section taken along the XZ plane (refer to FIG. 19). The thickness in the Z-direction of the fixing block portion 412 is much thicker than that of the fixing block portion 112 according to the first embodiment.

The rear cylindrical portion 411b is formed in a substantially cylindrical shape along the Y-direction with the outer diameter smaller than fixing block portion 412. Similarly to the fixing block portion 412, the rear cylindrical portion 411b is also formed in that the thickness in the Z-direction is thicker than that in the X-direction. The thickness of the rear cylindrical portion 411b in the Z-direction is much thicker than the thickness of the cylindrical portion 111 according to the first embodiment.

While the front cylindrical portion 411a is formed in a cylindrical shape along the Y-direction with the outer diameter further smaller than the rear cylindrical portion 411b. The front cylindrical portion 411a is formed to be of even thickness.

Also in the embodiment, the thermopile holder 410 is made of a material of high heat conductivity and high electric conductivity such as copper, silver, aluminum, iron, or gold.

As mentioned above, since its thickness is fairly thick, the thermopile holder 410 has a higher thermal capacity than the thermopile holder 110 of the first embodiment.

According to this, when the thermopile 10 is inserted into the thermopile holder 410, it is possible to keep even the temperature near the thermopile 10 and make the inner temperature of the thermopile 10 equal to the temperature of the peripheral members of the thermopile 10 described later. As a result, a more accurate measured temperature can be obtained by using the thermopile holder 410.

The thermopile housing hole 412H is provided in the fixing block portion 412. The fixing block portion 412 communicates with the inner space of the front cylindrical portion 411a and the rear cylindrical portion 411b.

As illustrated by the arrow F1 in FIG. 20, the fixing ring 420, the thermopile 10, and the fixing rear cap 430 are sequentially inserted into the thermopile housing hole 412H of the fixing block portion 412.

As illustrated by the arrow F2 in FIG. 20, a first circular slit member 411S and a second circular slit member 412S are inserted into the front cylindrical portion 411a and the rear cylindrical portion 411b. A third circular slit member 413S is attached to the end portion of the cylindrical portion 411a in the Y-direction.

In this state, a lens holder 500 is attached to the front cylindrical portion 411a of the thermopile holder 410. The infrared radiation concentrating lens 200L is attached to the end portion of the lens holder 500. The length of this lens holder 500 is shorter than that of the lens holder 200 of the first embodiment in the Y-direction.

Similarly to the first embodiment, the amplifier attachment spacer 140 is attached to this assembled body including the thermopile 10 and its peripheral members, and by the amplifier attachment spacer 140 holding the preamplifier board 20, the infrared radiation concentrating unit 900 is completed (refer to FIG. 18). The inner structure of the infrared radiation concentrating unit 900 will be described in detail.

Figure 21A:
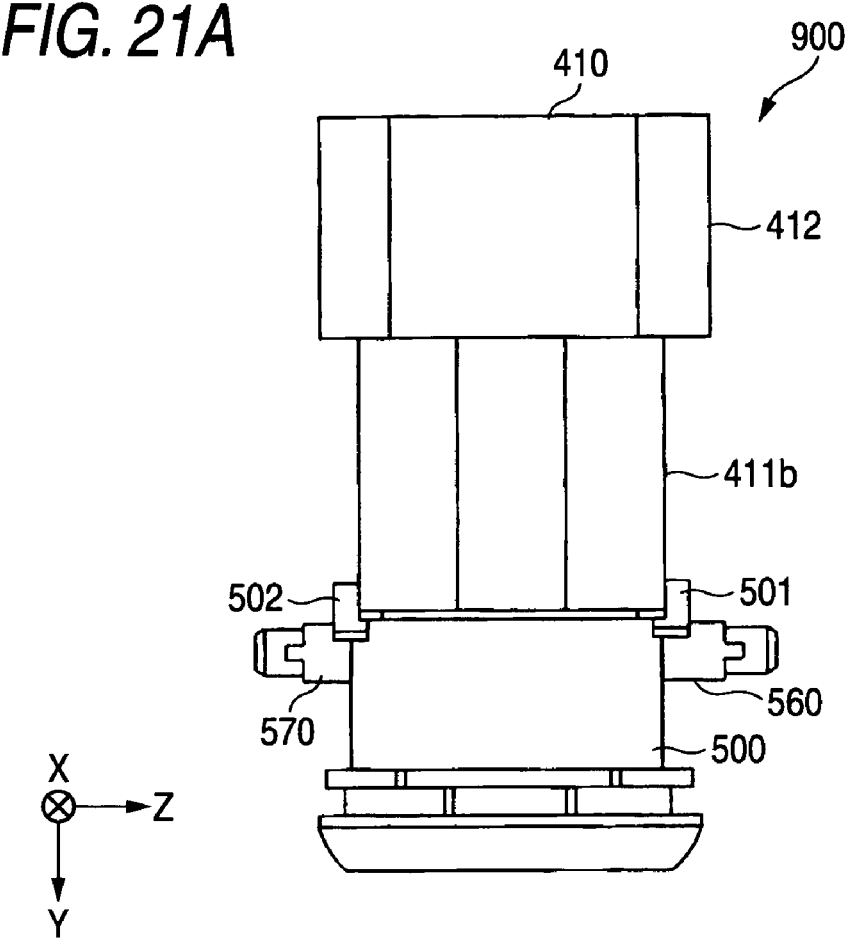
FIGS. 21A and 21B are side lateral views (YZ plane view viewed from the X-direction) and a front view of the infrared radiation concentrating unit of the radiation thermometer according to the second embodiment.
Figure 21B:
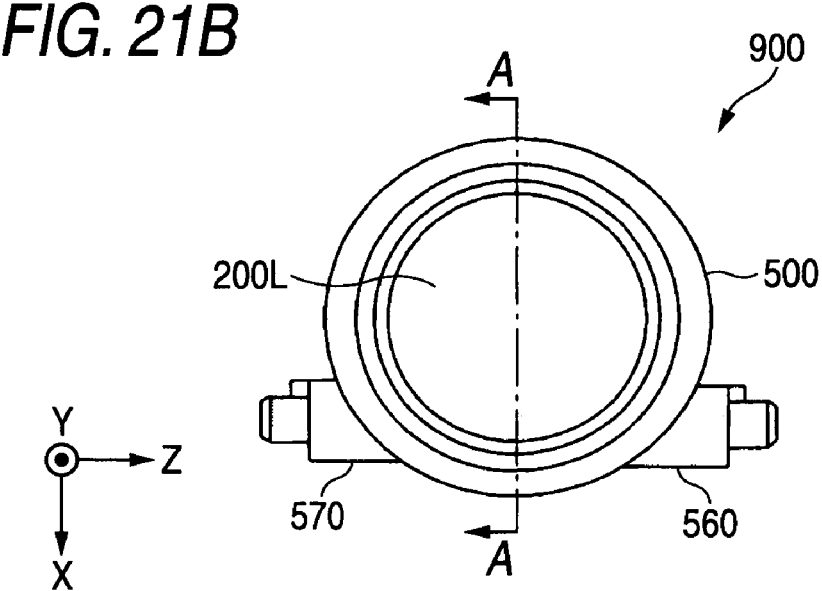
Figure 22:
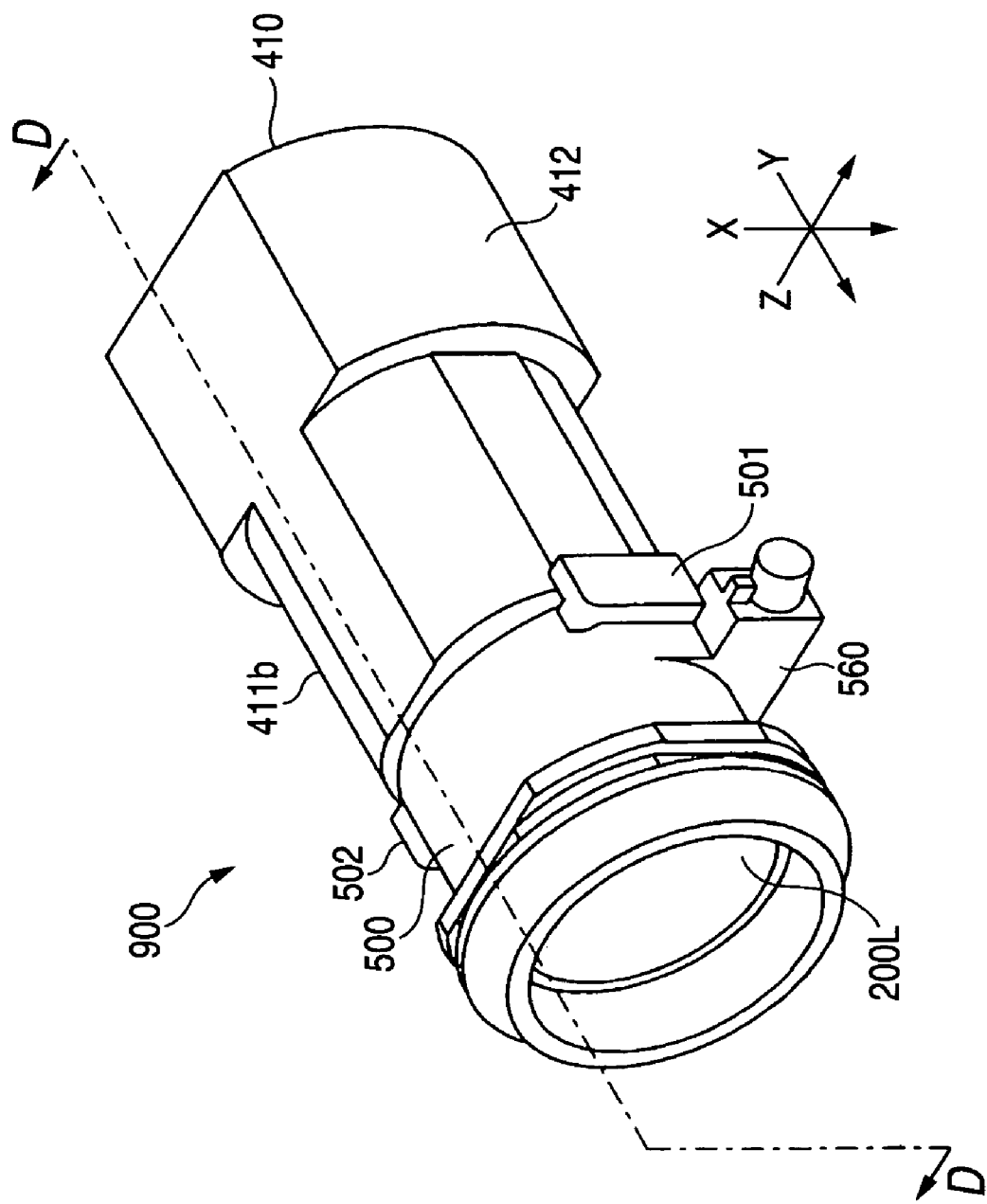
FIG. 22 is an appearance perspective view of the infrared radiation concentrating unit of the radiation thermometer according to the second embodiment.

FIG. 21 is a side lateral view (YZ plane view viewed from the X-direction) and a-front view of the infrared radiation concentrating unit 900 of the radiation thermometer according to the second embodiment, and FIG. 22 is an appearance perspective view of the infrared radiation concentrating unit 900 of the radiation thermometer according to the second embodiment.

Figure 23:
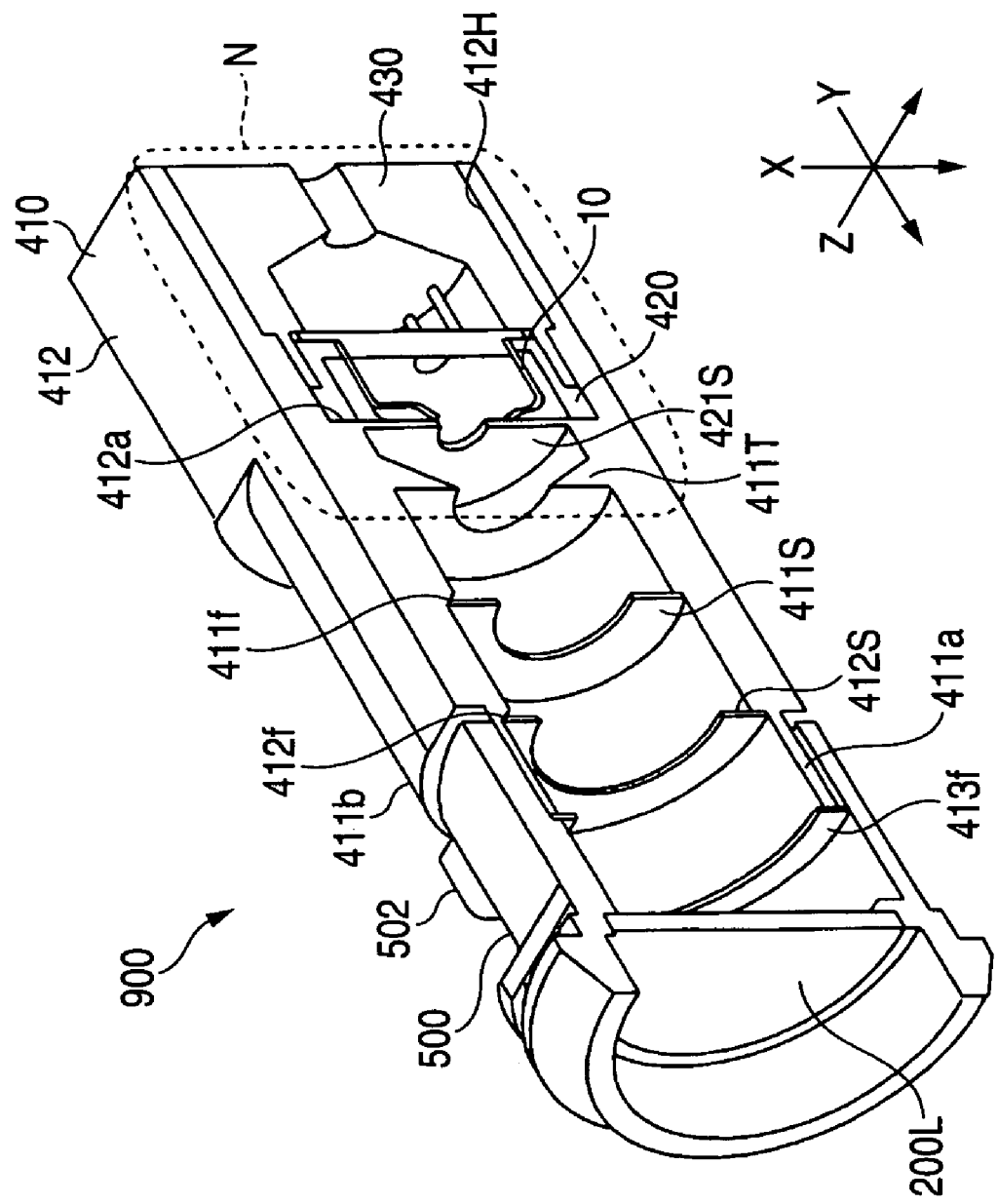
FIG. 23 is a cross-sectional view along the line D-D of the infrared radiation concentrating unit of FIG. 22.
Figure 24:
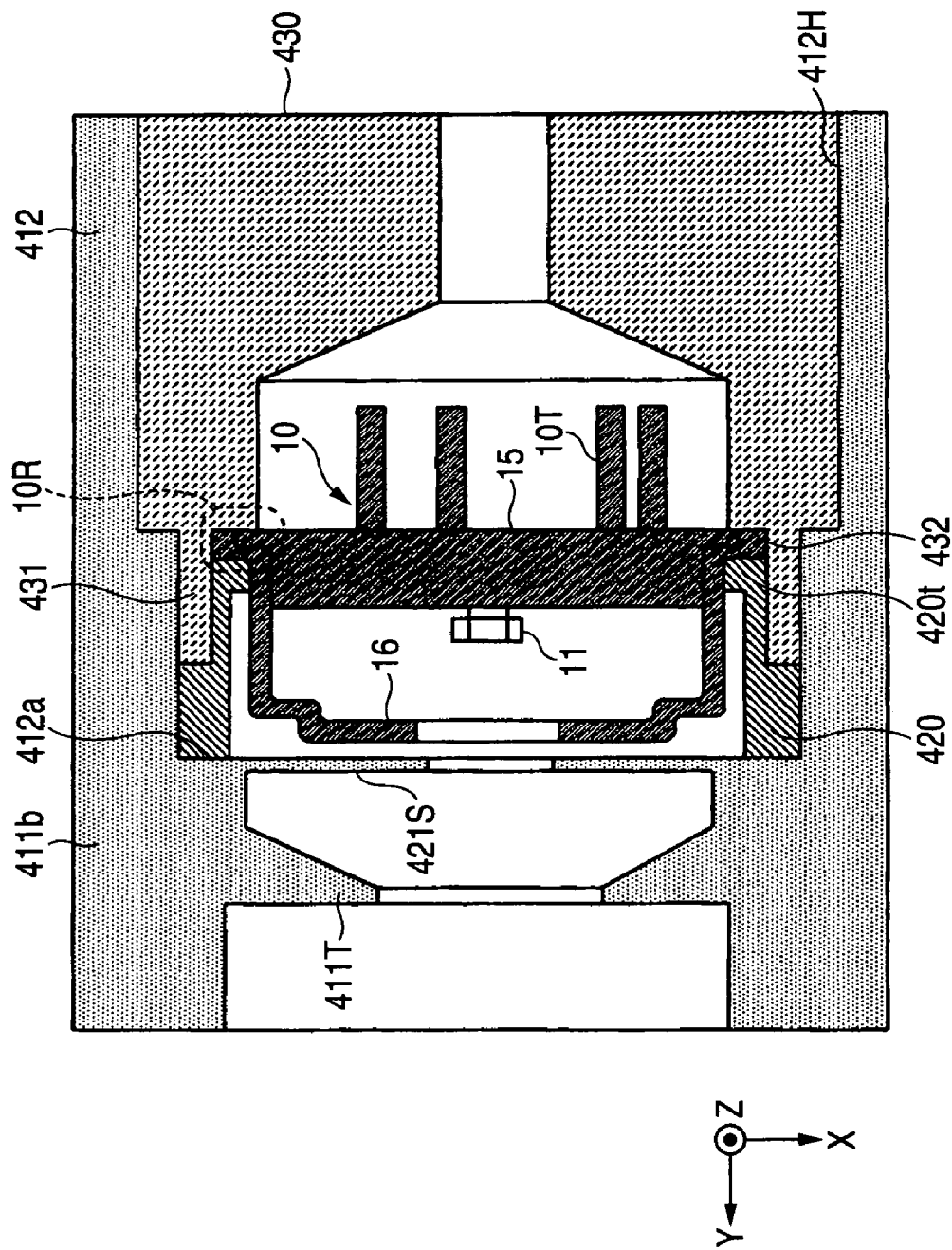
FIG. 24 is an enlarged cross-sectional view of the portion indicated by the dotted line of FIG. 23.

FIG. 23 is a cross-sectional view along the line D-D of the infrared radiation concentrating unit 900 of FIG. 22, and FIG. 24 is an enlarged cross-sectional view of the portion indicated by the dotted line N of FIG. 23.

As illustrated in FIG. 21 and FIG. 22, holder fixing pieces 501 and 502 are formed at the rear end of the lens holder 500, and the lens holder 500 is fixed to the end of the thermopile holder 410 by the holder pieces 501 and 502.

Similarly to the lens holder 200 of the first embodiment, the lens holder 500 has the laser supporting pole 560 and the laser supporting pole 570 protruding in the Z-direction.

As illustrated in FIG. 23, from the side of the fixing block portion 412, a slit projection 411T, a first knot 411f, and a second knot 412f are sequentially formed in the inner surfaces of the front cylindrical portion 411a and the rear cylindrical portion 411b.

The slit projection 411T protrudes from the inner surface of the rear cylindrical portion 411b toward its center and it has a circular slit (hole).

The first slit member 411S is attached to the first knot 411f. The second slit member 412S is attached to the second knot 412f.

Each circular slit (hole) of the third slit member 413S, the second slit member 412S, the first slit member 411S, and the slit projection 411T becomes smaller in this order.

A rear slit 421S is formed at the front end 412a of the thermopile housing hole 412H of the fixing block portion 412. The circular slit (hole) in the rear slit 421S is further smaller than the slit of the slit projection 411T.

These first slit member 411S, second slit member 412S, third slit member 413S, slit projection 411T, and rear slit 421S restrict the passage of the infrared radiation so that the infrared radiation concentrated by the infrared radiation concentrating lens 200L can enter the thermopile 10.

In this embodiment, since the five slits restrict the passage of the infrared radiation, the infrared radiation externally entering the head portion 100A through the infrared radiation concentrating lens 200L can entering the infrared radiation receiving portion 11 of the thermopile 10 without being reflected by the various materials within the head portion 10A. As a result, only the infrared radiation directly radiated from the measurement object can assuredly enter the infrared radiation receiving portion 11.

As illustrated by the enlarged cross-sectional view of FIG. 24, a fixing ring 420 attached to the rear portion of the rear slit 421S is formed in a substantially cylindrical shape, in the thermopile housing hole 412H. The rear end of the fixing ring 420 is a little protrudent inwardly. This protrudent portion is hereinafter referred to as a rear protrudent portion 420t.

The thermopile 10 has such a structure that a metal cap 16 with a circular window is attached to one side of a circular base 15 with the infrared radiation receiving portion 11 fixed there. From the other side of the circular base 15, a plurality of terminals 10T are extended in the Y-direction.

The thermopile 10 having the above structure has a brim 10R all around the circular base 15 at a connected portion of the circular base 15 and the metal cap 16 (refer to the dotted line of FIG. 24 and FIG. 20).

The fixing rear cap 430 has a stepped portion 432 for firmly fixing the thermopile 10 therein.

As mentioned above, when the fixing ring 420, the thermopile 10, and the fixing rear cap 430 are sequentially inserted into the thermopile housing hole 412H, the brim 10R is pinched between the rear end protrudent portion 420t of the fixing ring 420 and the stepped portion 432 of the fixing rear cap 430 and fixed there.

The metal cap 16 of the thermopile 10 is arranged so as to cover the infrared radiation receiving portion 11.

When there occurs a change in the temperature around the metal cap 16 positioned at the detecting surface of the infrared radiation receiving portion 11, error may occur in the detected temperature.

The local temperature change in the metal cap 16 easily occurs in a contact portion of the fixing ring 420 for fixing the thermopile 10 and the metal cap 16.

In the infrared radiation concentrating unit 900 of the embodiment, the contract portion of the fixing ring 420 and the thermopile 10 is restricted to the brim 10R that is the contact portion of the circular base 15 and the metal cap 16. This can restrain the local temperature change in the metal cap 16 positioned at the detecting surface of the infrared radiation receiving portion 11 and the error generation in the detected temperature fully.

The circular slit of the rear slit 421S integrated with the thermopile holder 410 is formed smaller than the circular window of the metal cap 16.

As mentioned above, the thermopile 10 is assuredly located within the thermopile holder 410 according to the fixing ring 420 and the fixing rear cap 430. Thus, the visual angle on the side of the front surface KF (refer to FIG. 7) of the infrared radiation concentrating unit 11 within the metal cap 16 is accurately set by the rear slit 421S regardless of the shape of the window of the metal cap 16.

Similarly to the first embodiment, the above assembled infrared radiation concentrating unit 900 is built in the head casing K as the assembled body together with the main board 30, the power supply board 40, the junction board 50 and the main frame 300. In these ways, the head portion 100A of the radiation thermometer 100 according to the second embodiment is completed (refer to FIG. 18 and FIG. 19).

Also in this embodiment, the thermopile holder 410 is arranged out of contact with the heat diffusion member 90. As a result, there exists an air layer between the thermopile holder 410 with the thermopile 10 inserted and the heat diffusion member 90. This air layer works as a heat insulating layer. As a result, the heat generated by the main board 30, the power supply board 40, and the laser diodes 60 and 70 are difficult to transmit to the thermopile holder 410 and the thermopile 10 through the heat diffusion member 90.

In this embodiment, the first slit member 411S, the second slit member 412S, the third slit member 413S, and the fixing rear cap 430 are also made of a material of high heat conductivity and high electric conductivity such as copper, silver, aluminum, iron, or gold. Also in the embodiment, it is possible to keep the temperature around the thermopile 10 even, similarly to the first embodiment.

The above lens holder 500 is made of a material of low heat conductivity such as resin, similarly to the lens holder 200 of the first embodiment. This makes it difficult to transmit the heat generated by the laser diodes 60 and 70 to the lens holder 500. Thus, the heat generated by the laser diodes 60 and 70 is difficult to transmit to the thermopile 10.

In the radiation thermometers 100 according to the first embodiment and the second embodiment, the head casing K corresponds to a casing, the front surface KF corresponds to a first surface, the back surface KB corresponds to a second surface, the upper surface KU corresponds to a third surface, the down surface KD corresponds to a fourth surface, the side surface KS1 corresponds to a fifth surface, the side surface KS2 corresponds to a sixth surface, and the infrared radiation concentrating unit KH corresponds to an infrared radiation passing unit.

The thermopile 10 corresponds to a sensing element, the first signal amplifier 21 and the second signal amplifier 22 correspond to a first circuit, the preamplifier board 20 corresponds to a first board, the circuit including the CPU 34 corresponds to a second circuit, the main board 30 corresponds to a second board, the circuit including the power supply circuit 41 corresponds to a third circuit, and the power supply board 40 corresponds to a third board.

The heat diffusion member 90 and the ground conductive surface 50G of the junction board 50 correspond to a heat diffusion member, the laser diode 60 corresponds to a first light source, the laser diode 70 corresponds to a second light source, the laser driving circuit 37 corresponds to a first driving circuit, and the laser driving circuit 43 corresponds to a second driving circuit.

The CPU 34 corresponds to a control circuit, the indication light 36 corresponds to an indication element, and the air layers between the thermopile 10 and the heat diffusion member 90 and between each of the main board 30, the power supply board 40, and the laser diodes 60 and 70 and the heat diffusion member 90 correspond to a space.

The invention is applicable to detect the infrared energy radiated from an object.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A radiation thermometer for measuring temperature of an object to be measured, comprising:
   a casing having a first and a second surfaces mutually facing and a third and a fourth surfaces mutually facing, and including an infrared radiation passing unit, which passes infrared radiation radiated from the object to be measured, on the first surface;
   a sensing element located within the casing, which detects infrared energy of the infrared radiation which has passed through the infrared radiation passing unit;
   a first board located within the casing between the second surface and the sensing element along the second surface, the first board having a first circuit installed thereon, which amplifies an output signal of the sensing element;
   a second board located within the casing between the third surface and the sensing element along the third surface, the second board having a second circuit installed thereon, which calculates temperature of the object to be measured according to a signal given from the first circuit of the first board;
   a third board located within the casing between the fourth surface and the sensing element along the fourth surface, the third board having a third circuit installed thereon, which supplies power to the first and the second circuits;
   a first and a second light sources located within the casing, which emit light to the object to be measured; and
   a heat diffusion member located within the casing,
   wherein an infrared radiation passage for leading the infrared radiation from the infrared radiation passing unit to the sensing element is formed within the casing,
   the first light source is located between the infrared radiation passage and the third surface,
   the second light source is located between the infrared radiation passage and the fourth surface, and
   the heat diffusion member is located between the infrared radiation passage and the first light source, between the infrared radiation passage and the second light source, between the second board and each of the sensing element and the first board, and between the third board and each of the sensing element and the first board.

2. The radiation thermometer according to claim 1, wherein
   the casing further has a fifth and a sixth surfaces and
   the heat diffusion member is located between the fifth surface and each of the sensing element, the first board, and the infrared radiation passage and between the sixth surface and each of the sensing element, the first board, and the infrared radiation passage.

3. The radiation thermometer according to claim 1, wherein
   space is provided between the heat diffusion member and each of the sensing element and the first board and between the heat diffusion member and each of the second board, the third board, the first light source, and the second light source.

4. The radiation thermometer according to claim 1, wherein
   the second circuit includes a first driving circuit for driving the first light source, and a control circuit for calculating the temperature of the object to be measured according to the signal given from the first circuit and controlling the first driving circuit.

5. The radiation thermometer according to claim 4, wherein
   the second circuit includes an indication element, and
   the control circuit controls the indication element according to the calculated temperature of the object to be measured.

6. The radiation thermometer according to claim 4, wherein
   the third circuit includes a second driving circuit for diving the second light source, and
   the control circuit controls the second driving circuit.

7. The radiation thermometer according to claim 2, wherein
   space is provided between the heat diffusion member and each of the sensing element and the first board and between the heat diffusion member and each of the second board, the third board, the first light source, and the second light source.

8. The radiation thermometer according to claim 7, wherein
   the second circuit includes a first driving circuit for driving the first light source, and a control circuit for calculating the temperature of the object to be measured according to the signal given from the first circuit and controlling the first driving circuit.

9. The radiation thermometer according to claim 8, wherein
the second circuit includes an indication element, and
the control circuit controls the indication element according to the calculated temperature of the object to be measured.

10. The radiation thermometer according to claim 8, wherein
the third circuit includes a second driving circuit for driving the second light source, and
the control circuit controls the second driving circuit.

11. The radiation thermometer according to claim 2, wherein
the second circuit includes a first driving circuit for driving the first light source, and a control circuit for calculating the temperature of the object to be measured according to the signal given from the first circuit and controlling the first driving circuit.

12. The radiation thermometer according to claim 3, wherein
the second circuit includes a first driving circuit for driving the first light source, and a control circuit for calculating the temperature of the object to be measured according to the signal given from the first circuit and controlling the first driving circuit.

13. The radiation thermometer according to claim 11, wherein
the second circuit includes an indication element, and
the control circuit controls the indication element according to the calculated temperature.

14. The radiation thermometer according to claim 11, wherein the third circuit includes a second driving circuit for driving the second light source, and the control circuit controls the second driving circuit.

* * * * *

UNITED STATES PATENT AND TRADEMARK OFFICE
CERTIFICATE OF CORRECTION

| | |
|---|---|
| PATENT NO. | : 7,249,884 B2 |
| APPLICATION NO. | : 11/324060 |
| DATED | : July 31, 2007 |
| INVENTOR(S) | : Torii et al. |

Page 1 of 1

It is certified that error appears in the above-identified patent and that said Letters Patent is hereby corrected as shown below:

IN THE CLAIMS:

Claim 13, column 22, line 12, "calculated temperature." should read --calculated temperature of the object to be measured.--

Signed and Sealed this

Thirtieth Day of October, 2007

JON W. DUDAS
*Director of the United States Patent and Trademark Office*